United States Patent
Nakatani et al.

(10) Patent No.: US 7,197,236 B2
(45) Date of Patent: Mar. 27, 2007

(54) RECORDING/PLAYBACK APPARATUS, PLAYBACK APPARATUS, COMPUTER-READABLE RECORDING MEDIUM, PROGRAM AND METHOD

(75) Inventors: Tokuo Nakatani, Katano (JP); Satoshi Yabuta, Takatsuki (JP); Kazuhiko Nakamura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1266 days.

(21) Appl. No.: 10/011,734

(22) Filed: Dec. 11, 2001

(65) Prior Publication Data

US 2002/0114614 A1     Aug. 22, 2002

(30) Foreign Application Priority Data

Dec. 22, 2000 (JP) ............................. 2000-391559

(51) Int. Cl.
  *H04N 7/64* (2006.01)
  *H04N 5/781* (2006.01)
  *H04N 5/00* (2006.01)

(52) U.S. Cl. ...................................... 386/113; 386/126

(58) Field of Classification Search .................... 386/1, 386/45, 95, 125, 126; 369/53.15, 47.14, 369/53.12, 53.18–53.19, 53.26–53.27, 53.37
See application file for complete search history.

(56) References Cited

U.S. PATENT DOCUMENTS 5,319,626 A * 6/1994 Ozaki et al. ............. 369/53.17
6,564,345 B1 * 5/2003 Kim et al. ................... 714/723
6,621,782 B1 * 9/2003 Nakane et al. ............. 369/53.1
7,016,275 B1 * 3/2006 Lee et al. ................. 369/47.14
7,016,276 B2 * 3/2006 Gotoh et al. ............. 369/47.14

FOREIGN PATENT DOCUMENTS

EP      0 724 264         7/1996
JP      10-269684        10/1998

* cited by examiner

*Primary Examiner*—Thai Q. Tran
*Assistant Examiner*—Gelek Topgyal
(74) *Attorney, Agent, or Firm*—Wenderoth, Lind & Ponack, L.L.P.

(57) ABSTRACT

A recording/playback apparatus for a DVD on which a VOB and a management file of the VOB are recorded. When detecting a failure in the management file, the recording/playback apparatus changes the state of the DVD to: (a) a first state in which reading/writing of the DVD is available; (b) a second state in which reading/writing of the DVD is available but the VOB cannot be played back; or (c) a read only state, in accordance with the detected failure. When the state of the DVD changes to the second state, the recording/playback apparatus writes a new VOB onto the DVD. When the state of the DVD changes to the read only state, the recording/playback apparatus plays back the VOB recorded on the DVD.

26 Claims, 36 Drawing Sheets

FIG. 16

PG STATE FLAG #1 =
CELL STATE FLAG #1 U TMAP STATE FLAG #1 U VOB STATE FLAG #1

PG STATE FLAG #2 =
CELL STATE FLAG #2 U TMAP STATE FLAG #2 U VOB STATE FLAG #1

PL STATE FLAG #1 =
CELL STATE FLAG #1 U CELL STATE FLAG #2 U TMAP STATE FLAG #1 U TMAP STATE FLAG #2 U VOB STATE FLAG #1 U VOB STATE FLAG #2

FIG. 26A

1ST PRIORITY LEVEL            2ND PRIORITY LEVEL                 3RD PRIORITY LEVEL
MANAGEMENT FILE FAILURE (1) > MANAGEMENT FILE FAILURE (2)  >    CELL FAILURE (5)
                              CELL FAILURE (3)                   TMAP FAILURE (6)
                              CELL FAILURE (4)                   VOB FAILURE (7)

FIG. 26B

| | VOLUME STATE FLAG | PG STATE FLAG | | |
| --- | --- | --- | --- | --- |
| | | CELL STATE FLAG | TMAP STATE FLAG | VOB STATE FLAG |
| MANAGEMENT FILE FAILURE (1) | NotOpen | -- | -- | -- |
| MANAGEMENT FILE FAILURE (2) | Read Only | -- | -- | -- |
| CELL FAILURE (3) | Read Only | Play NG | -- | -- |
| CELL FAILURE (4) | Read Only | Play NG | -- | -- |
| CELL FAILURE (5) | -- | -- | -- | -- |
| TMAP FAILURE (6) | -- | -- | Edit NG | -- |
| VOB FAILURE (7) | -- | -- | -- | Play NG |

1ST PRIORITY LEVEL: MANAGEMENT FILE FAILURE (1), MANAGEMENT FILE FAILURE (2)
2ND PRIORITY LEVEL: CELL FAILURE (3), CELL FAILURE (4)
3RD PRIORITY LEVEL: CELL FAILURE (5), TMAP FAILURE (6), VOB FAILURE (7)

RECORDING/PLAYBACK APPARATUS, PLAYBACK APPARATUS, COMPUTER-READABLE RECORDING MEDIUM, PROGRAM AND METHOD

BACKGROUND OF THE INVENTION (1) Field of the Invention

The present invention relates to a recording/playback apparatus for recording and playing back data to/from a rewritable optical disc such as DVD-RAM, DVD-R, and DVD-RW.

(2) Description of the Related Art

Recording/playback apparatuses for rewritable optical discs can perform variable playback operations such as special playback and random access operations and can also perform variable editing operations such as virtual and real editing operations, by accessing discs conforming to the DVD-VIDEO RECORDING standard. Such recording/playback apparatuses have enormous values as commercial products. In such recording/playback apparatuses, the program for performing recording, playback, and editing presumes that the video data and management information recorded on the DVD has a data structure that conforms to the DVD-VIDEO RECORDING standard. The program fails to operate normally when trying to play back or edit data without a data structure that conforms to the DVD-VIDEO RECORDING standard.

When a DVD recording video data is inserted, a recording/playback apparatus performs an initial check to see whether the video data and management information recorded on the DVD conforms to the DVD-VIDEO RECORDING standard and whether the DVD has a portion that does not conform to the DVD-VIDEO RECORDING standard. The serious failures found through this inspection include: (1) destruction of the management information used for accessing the video data; (2) destruction of the management information related to playing back of the video data; (3) incorrect addresses of the video data or the management information; and (4) incorrect time codes of the video data. It is well known that such failures are caused by the dust or flaws on the disc surface. The general versatility of the DVD that the DVD can be accessed by even commercial personal computers is one of the main selling points of the DVD. Accordingly, a failure occurs when a personal computer writes data that violates the standard. There is another serious failure which is called a version confliction where the video data or the management information recorded on the disc conforms to a DVD-VIDEO RECORDING standard that is higher than the versions that the recording/playback apparatus can deal with. This failure can also interfere the normal operation of the recording/playback apparatus.

When a serious failure such as the destruction of the management information is found in the initial check of the inserted disc, conventional recording/playback apparatuses regard the DVD as an invalid disc. The recording/playback apparatus does not read nor write data from/to the "invalid disc", without recognizing it as a medium. When this happens, the inserted DVD is treated in the same way as a recording medium that cannot be accessed by the recording/playback apparatus physically. Accordingly, to use the DVD, the user must initialize the DVD. With such initial check and recognition of discs with failures as invalid discs, it is possible to prevent the program loaded onto the recording/playback apparatus from hanging up. This increases the reliability of the recording/playback apparatus.

However, when light failures are treated in the same way as the serious failures, users would be required to initialize DVDs frequently.

On the contrary, when light failures are overlooked, users would worry that the playback/recording/editing program may start to operate abnormally at any moment.

SUMMARY OF THE INVENTION

The object of the present invention, therefore, is to provide a recording/playback apparatus that can appropriately operate in accordance with a failure that may be detected in the video data or the management information recorded on an optical disc.

The above object is fulfilled by a recording/playback apparatus for an optical disc on which a video object and management information of the video object are recorded, the recording/playback apparatus comprising: a detecting unit operable to detect a failure in the management information recorded on the optical disc inserted in the recording/playback apparatus; a state transition control unit operable to change a state of the inserted optical disc to (a) a first state in which reading/writing of the inserted optical disc is not available if the detected failure is a serious failure and (b) a second state in which reading/writing of the inserted optical disc is available but playback of the video object is not available if the detected failure is a light failure; and a writing unit operable to write data onto the optical disc when the state of the inserted optical disc is changed to the second state.

With the above construction, when detecting a failure of the optical disc relating to the playback of video data, the recording/playback apparatus changes the state of the optical disc to a state in which reading/writing of the optical disc is available, but playback of the video object is not available. This state prevents the recording/playback apparatus from hanging up during a playback since the apparatus does not play back the video data. However, in the reading/writing available state, the apparatus can read or write data from/to the optical disc. This enables the apparatus to write a new video object without initializing the optical disc. As a result, the user does not have to initialize the optical disc frequently.

The above object is also fulfilled by a recording/playback apparatus for an optical disc on which a video object and management information of the video object are recorded, the recording/playback apparatus comprising: a detecting unit operable to detect a failure in the management information recorded on the optical disc inserted in the recording/playback apparatus; a state transition control unit operable to change a state of the inserted optical disc to (a) a first state in which reading/writing of the inserted optical disc is not available if the detected failure is a serious failure, (b) a second state in which reading/writing of the inserted optical disc is available but playback of the video object is not available if the detected failure is a first light failure, and (c) a read only state if the detected failure is a second light failure; a writing unit operable to write data onto the optical disc if the state of the inserted optical disc is changed to the second state; and a playback unit operable to play back the video object recorded on the inserted optical disc if the state of the inserted optical disc is changed to the read only state.

With the above construction, when detecting a failure that the recorded video data conforms to a DVD-VIDEO RECORDING standard that is higher than the versions that the recording/playback apparatus can deal with, the recording/playback apparatus changes the state of the optical disc to a read only state to preserve the data on the disc. This prevents the recording/playback apparatus from unnecessarily updating and destroying the video data recorded on the DVD that conforms to a DVD-VIDEO RECORDING standard higher than those the apparatus can deal with.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 16 shows logical OR operations used to set the PG state flags and the PL state flags;

FIG. 26A shows an example of priority levels assigned to failures;

FIG. 26B shows how the disc state is determined from found failures in consideration of the priority levels shown in FIG. 26A;

DESCRIPTION OF THE PREFERRED EMBODIMENT

The following describes a recording/playback apparatus according to an embodiment of the present invention with reference to the attached drawings.

Figure 1:
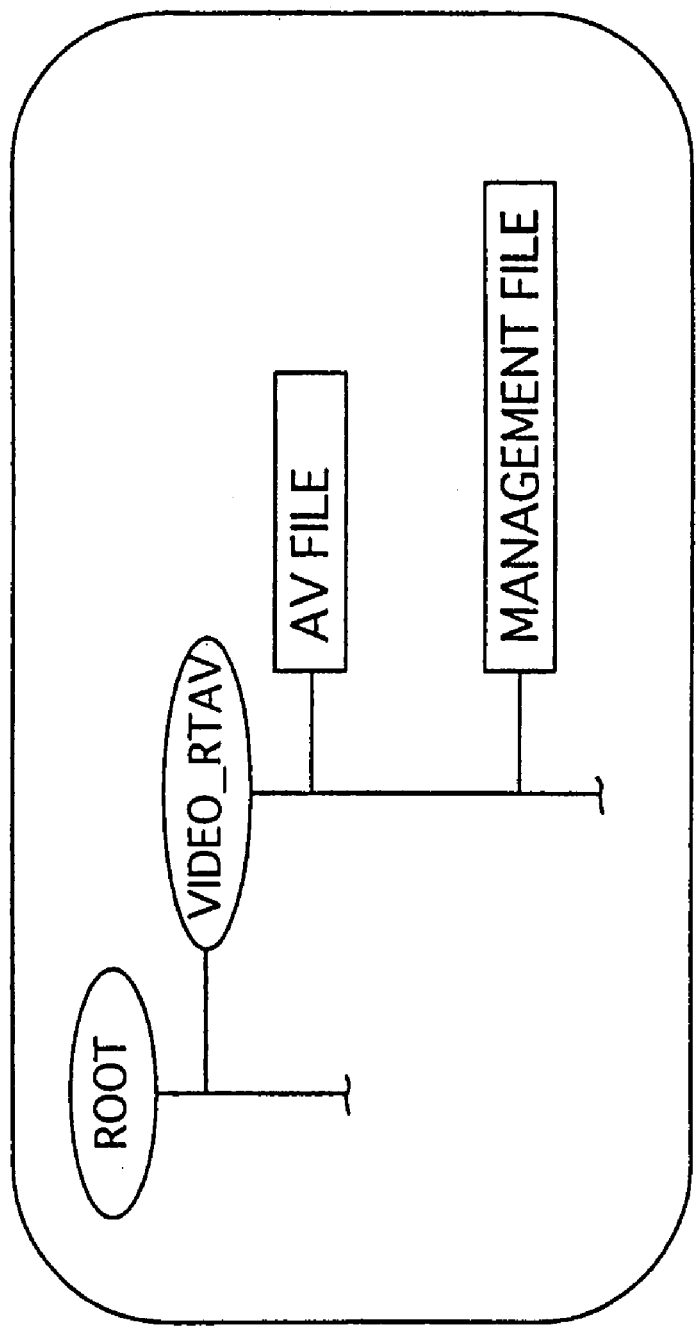
FIG. 1 shows files and directories recorded on a DVD.

FIG. 1 shows files and directories recorded on a DVD. As shown in FIG. 1, the VIDEO_RTAV (RealTime recording Audio Video) directory is placed immediately under the ROOT directory. Immediately under the VIDEO_RTAV directory, the AV file containing some VOBs and the management file containing a variety of pieces of management information are placed.

Figure 2:
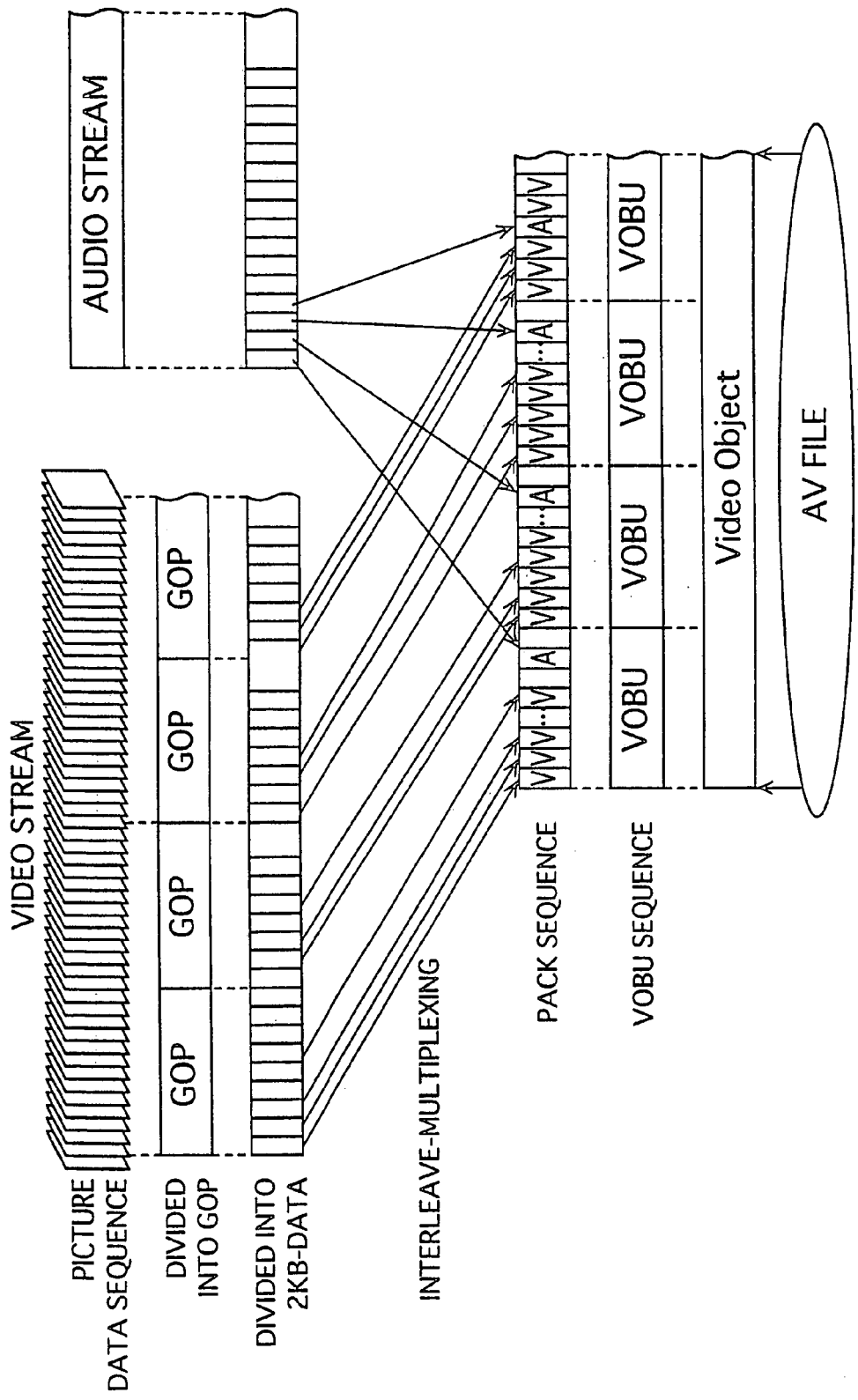
FIG. 2 shows a detailed construction of VOBs contained in AV files.

FIG. 2 shows a detailed construction of VOBs contained in AV files. Each VOB (Video Object) is a program stream conforming to the ISO/IEC13818-1 standard obtained by multiplexing video streams and audio streams, and does not have a "program_end_code" at the end of it. As shown in the upper-left block of FIG. 2, a video stream is a sequence of a plurality of pieces of picture data. As shown in the second row of the upper-left block, the picture data sequence is divided into a plurality of GOPs. Each GOP is further divided into a plurality of pieces of 2 KB-data (packs). Also, as shown in the upper-right corner of FIG. 2, an audio stream is divided into a plurality of pieces of 2 KB-data (packs). The video stream and audio stream are interleave-multiplexed in units of 2 KBs to form the pack sequence shown in the first row in the lower-right corner of FIG. 2. As shown in FIG. 2, the pack sequence is divided into a plurality of VOBUs (Video Object Units), and the VOB is composed of the plurality of VOBUs arranged in a time series. GOPs contain B-Pictures, P-Pictures, and I-Pictures. The B-Picture (Bidirectionally Predictive Picture) has been compressed in correlation with pictures in the past and future directions. The P-Picture (Predictive Picture) has been compressed in correlation with pictures in the past direction. The I-Picture (Intra Picture) has been compressed using the spatial frequency characteristic of pictures in one frame.

As understood from FIG. 2, VOBU is a unit that is an interleaved sequence of (a) video packs forming at least one GOP and (b) audio packs, where each GOP is composed of picture data to be played back for approximately 0.4 to 1.0 seconds, and both video and audio packs conform to the MPEG standard.

Figure 3:
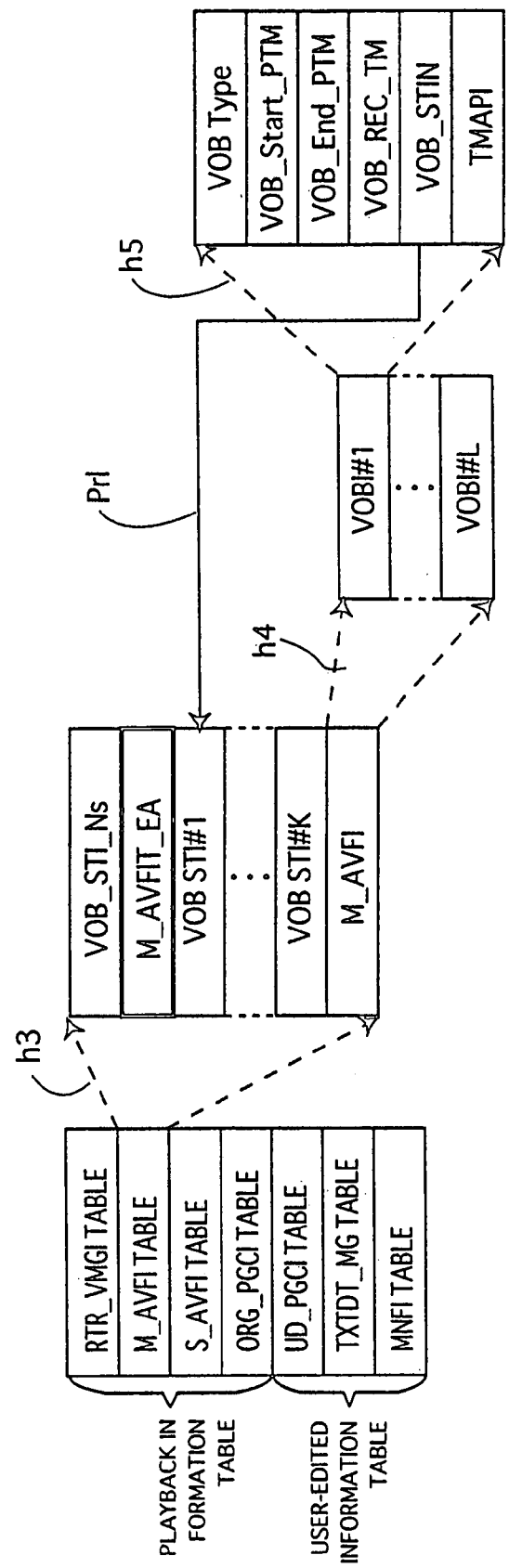
FIG. 3 shows the internal structure of the management file.

FIG. 3 shows the internal structure of the management file. As shown in FIG. 3, the management file is composed of an RTR_VMGI table (RTR_VMGIT), an M_AVFI table (M_AVFIT), an S_AVFI table (S_AVFIT), an ORG_PGCI table (ORG_PGCIT), a UD_PGCI table (UD_PGCIT), a TXTDT_MG table (TXTDT_MGT), and an MNFI table (MNFIT). Of these, RTR_VMGIT through ORG_PGCIT contain information necessary for the playback and are referred to as playback information tables, and UD_PGCIT through MNFIT contain information set by users during editing processes and are referred to as user-edited information tables.

The M_AVFI (Motion AV File Information) table is used for managing a VOB and is composed of, as indicated by the leader h3: a VOB_STI_Ns that indicates the number of VOB_STIs contained in the M_AVFIT; an M_AVFIT_EA (Effective Address) that shows the effective length of the M_AVFIT; VOB_STI (Stream Information) #1 . . . #K that is attribute information of the VOB; and an M_AVFI. The VOB STIs show video attributes (coding mode, aspect ratio, NTSC/PAL, line 21 information, etc.) of picture data contained in each VOB, and show audio attributes (coding mode, the number of channels, frequency, etc.) of audio data contained in each VOB.

The M_AVFI (Motion AV File Information) is composed of, as indicated by the leader h4, VOBI #1 . . . #L. Each VOBI (Video Object Information) is composed of, as indicated by the leader h5: a VOB_Type indicating the type of the VOB; a VOB_Start_PTM indicating a playback start time when the first picture of the video stream of the VOB is played back; a VOB_End_PTM indicating a playback end time when the last picture of the video stream of the VOB is played back; a VOB_REC_TM indicating the date and time when the VOB started being recorded; a VOB_STIN being a pointer that points out one among the VOB_STI #1 through #K that corresponds to the VOB, as indicated by the arrow Pr1; and a TMAPI being time map information of each VOBU constituting the VOB.

Figure 4:
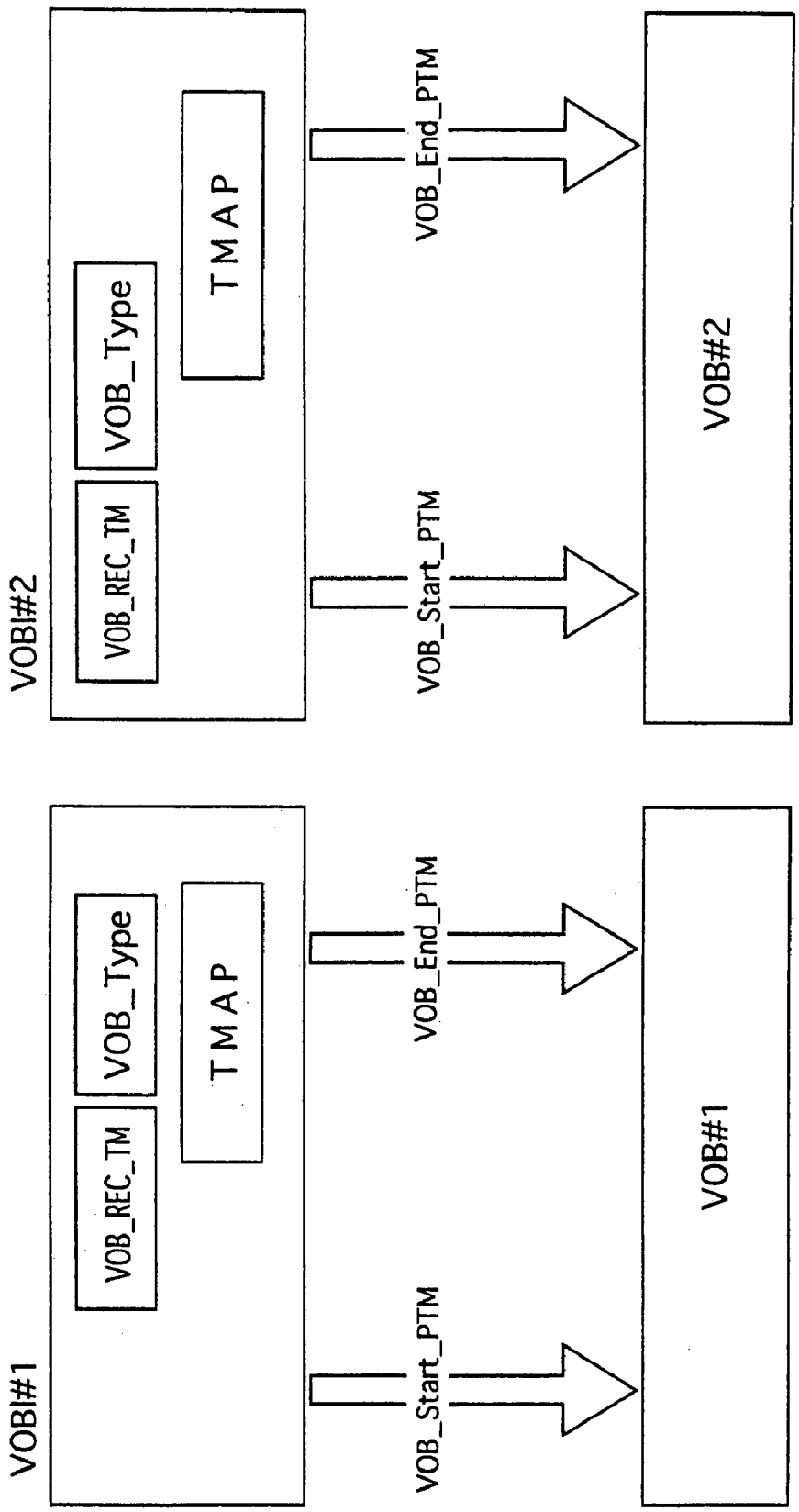
FIG. 4 shows relationships between VOBs and VOBIS.

FIG. 4 shows relationships between VOBs and VOBIs. In FIG. 4, the correspondence between the VOBs and the VOBIs is indicated by the identification numbers such as "#1" and "#2" attached to each VOBI and VOB. The playback start time and end time of each VOB are indicated by the VOB_Start_PTM and VOB_End_PTM, respectively.

Figure 5:
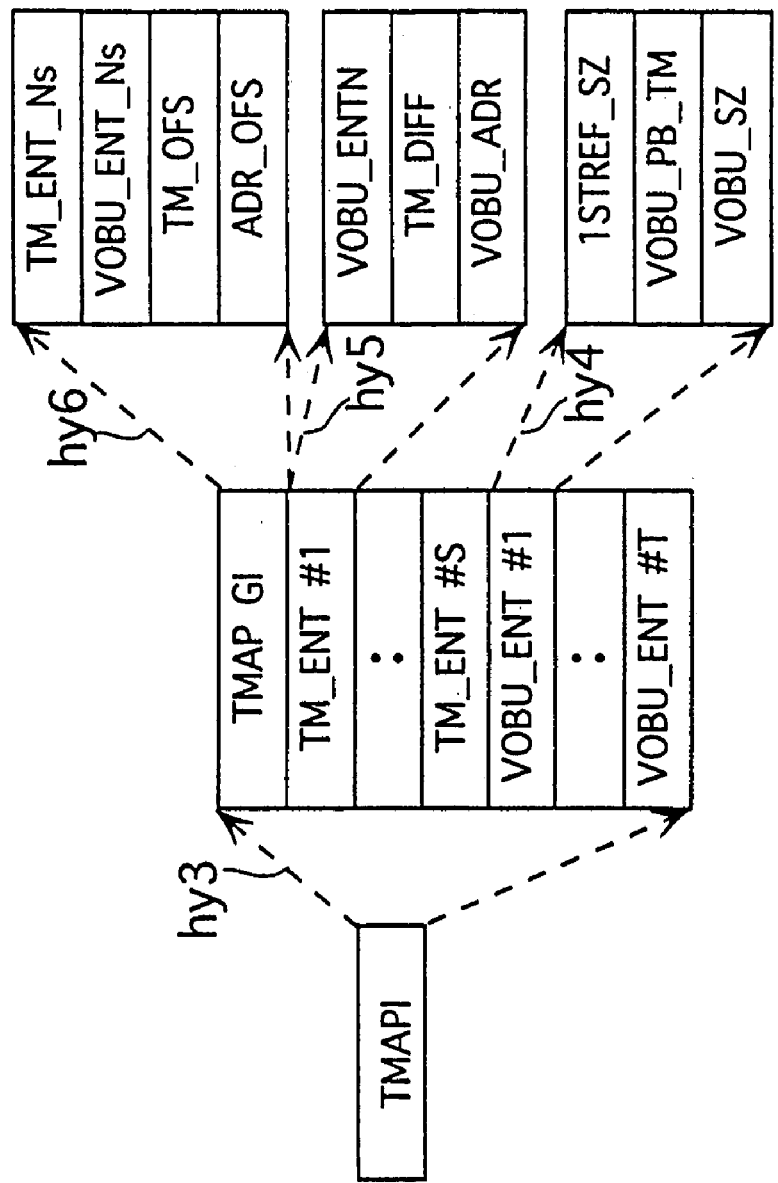
FIG. 5 shows the construction of the TMAPI.

Now, the TMAPI will be described. FIG. 5 shows the construction of the TMAPI. The TMAPI is composed of, as indicated by the leader hy3: a TMAP_GI (General Information); a TM_ENT #1 . . . #S; and a VOBU_ENT #1 . . . #T.

Each VOBU_ENT is information corresponding to a VOBU. The VOBU_ENT is composed of, as indicated by the leader hy4: a 1STREF_SZ indicating the size of the first I-Picture of the corresponding VOBU; a VOBU_PB_TM indicating a time period (on the order of 0.4 through 1.0 seconds) used for playing back the corresponding VOBU; and a VOBU_SZ indicating the size of the corresponding VOBU. Even if each VOBU has a different size, it is possible to access a VOBU at a given playback time by referring to the VOBU_ENT.

Each TM_ENT is information indicating the location of a time entry at intervals of 10 seconds. The TM_ENT is composed of, as indicated by the leader hy5: a VOBU_ENTN indicating a VOBU containing the time entry; a TM_DIFF indicating the offset time between the start of the VOBU indicated by the VOBU_ENTN and the time entry; and a VOBU_ADR indicating the offset data between the start of the VOB and the start of the VOBU indicated by the VOBU_ENTN. The TM_ENT provides high-speed accesses at intervals of 10 seconds.

The TMAP_GI (Time Map General Information) is information used for managing the whole TMAPI and is composed of, as indicated by the leader hy6: a TM_ENT_Ns indicating the number of time entries set in the VOB; a VOBU_ENT_Ns indicating the number of VOBU_ENTs contained in the TMAPI; a TM_OFS indicating the offset between the start of the VOB and one time entry; and an ADR_OFS indicating the offset between the start of the AV file and the start of the VOB.

Figure 6:
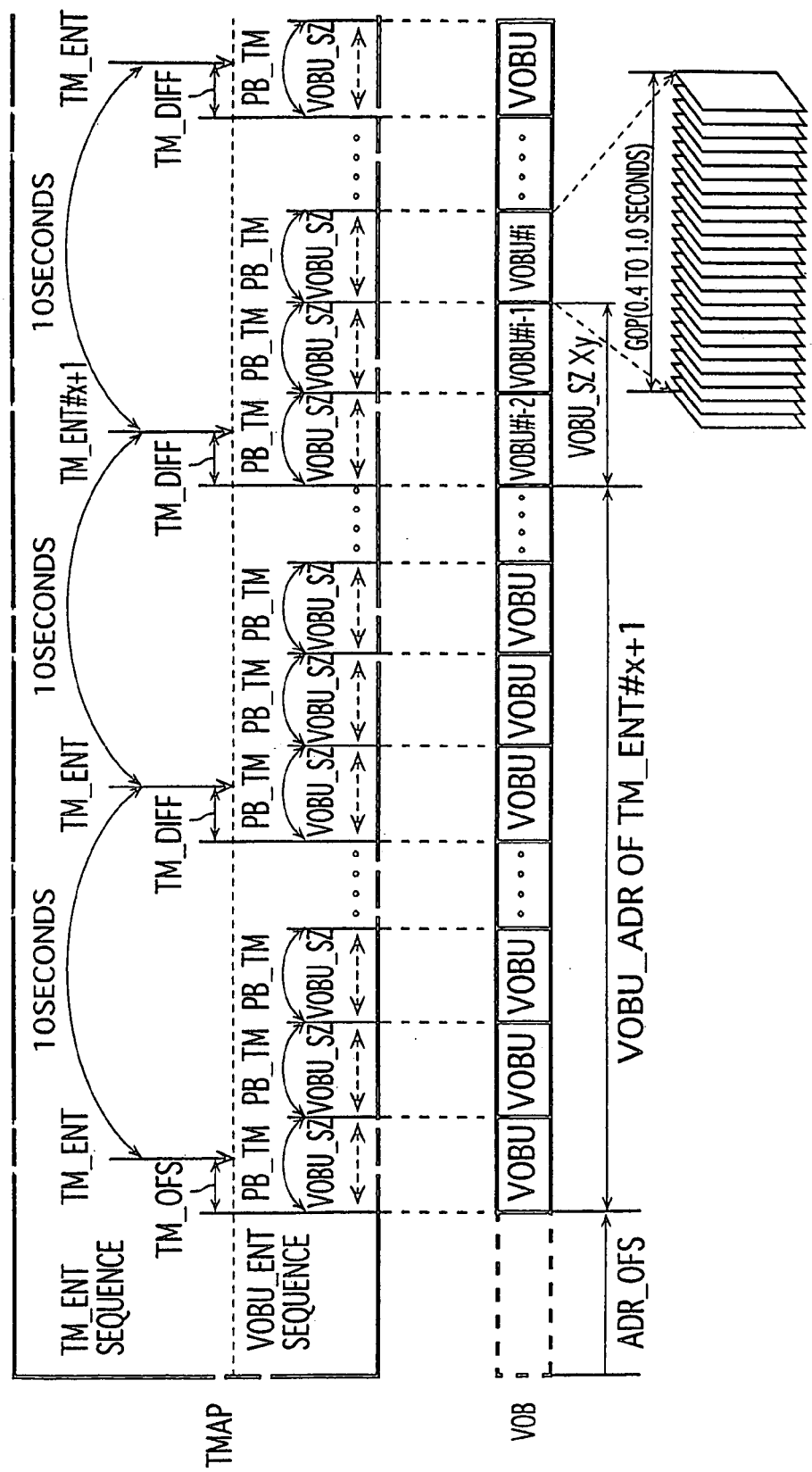
FIG. 6 shows relationships between TMAPIs and VOBUs.

FIG. 6 shows relationships between TMAPIs and VOBUs. The correspondence between the playback time and the size for each VOBU is shown by a combination of the VOBU_PB_TM (PB_TM in FIG. 6) and the VOBU_SZ. The TM_DIFF in the TM_ENT indicates how many seconds after a playback start of the VOBU the time entry is reached. The TMAPI with the above construction allows the VOBU corresponding to a given time code to be identified.

Figure 7:
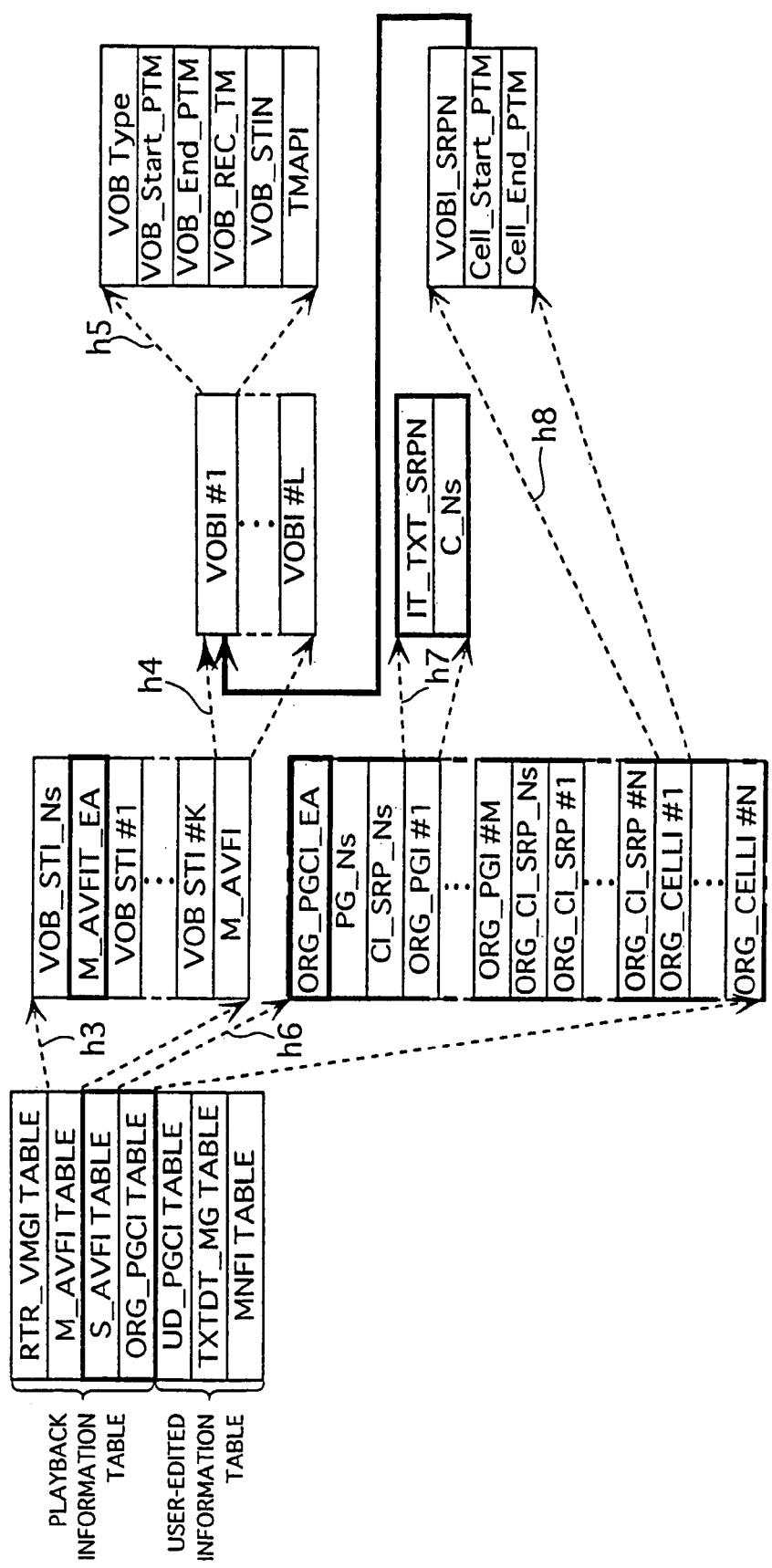
FIG. 7 shows the internal structure of the management file.

Up to now the M_AVFIT has been described. From now on, the S_AVFIT and the ORG_PGCIT contained in the management file will be described with reference to FIG. 7. FIG. 7 shows the internal structure of the management file. FIG. 7 differs from FIG. 3 in that the internal structure of the ORG_PGCI table is shown.

The S_AVFI (Still AV File Information) table is used to write various information concerning VOBs that are recorded on the DVD and should be played back as still pictures.

The ORG_PGCI (Original Program Chain Information) table defines details of the Original_Program Chain that is a playback route unique to the DVD. The ORG_PGCIT is composed of, as indicated by the leader h6: an OPG_PGCI_EA (Effective Address) indicating the effective length of the OPG_PGCI table; a PG_Ns indicating the number of Programs (PGs) contained in the ORG_PGC, where the Programs are units of playback; a CI_SRP_Ns indicating the number of search pointers for the CELLI (CI); an ORG_PGI #1 . . . #M which is information concerning each of a plurality of PGs contained in the ORG_PGC; an ORG-_CI_SRP #1 . . . #N being search pointers for a plurality of CELLIs; and an ORG_CELLI #1 . . . #N.

The ORG_CELLI is information on the CELLs constituting the ORG_PGC. Each CELL is a playback section constituting the ORG_PGC. More specifically, the ORG_CELLI contains (a) a pointer VOBI_SRPN specifying one among a plurality of VOBIs contained in the M_AVFIT that corresponds to the CELLI and (b) a CELL_Start_PTM and a CELL_End_PTM which are a pair of time codes showing a section in the VOB specified as a playback section (referred to as CELL).

Figure 8:
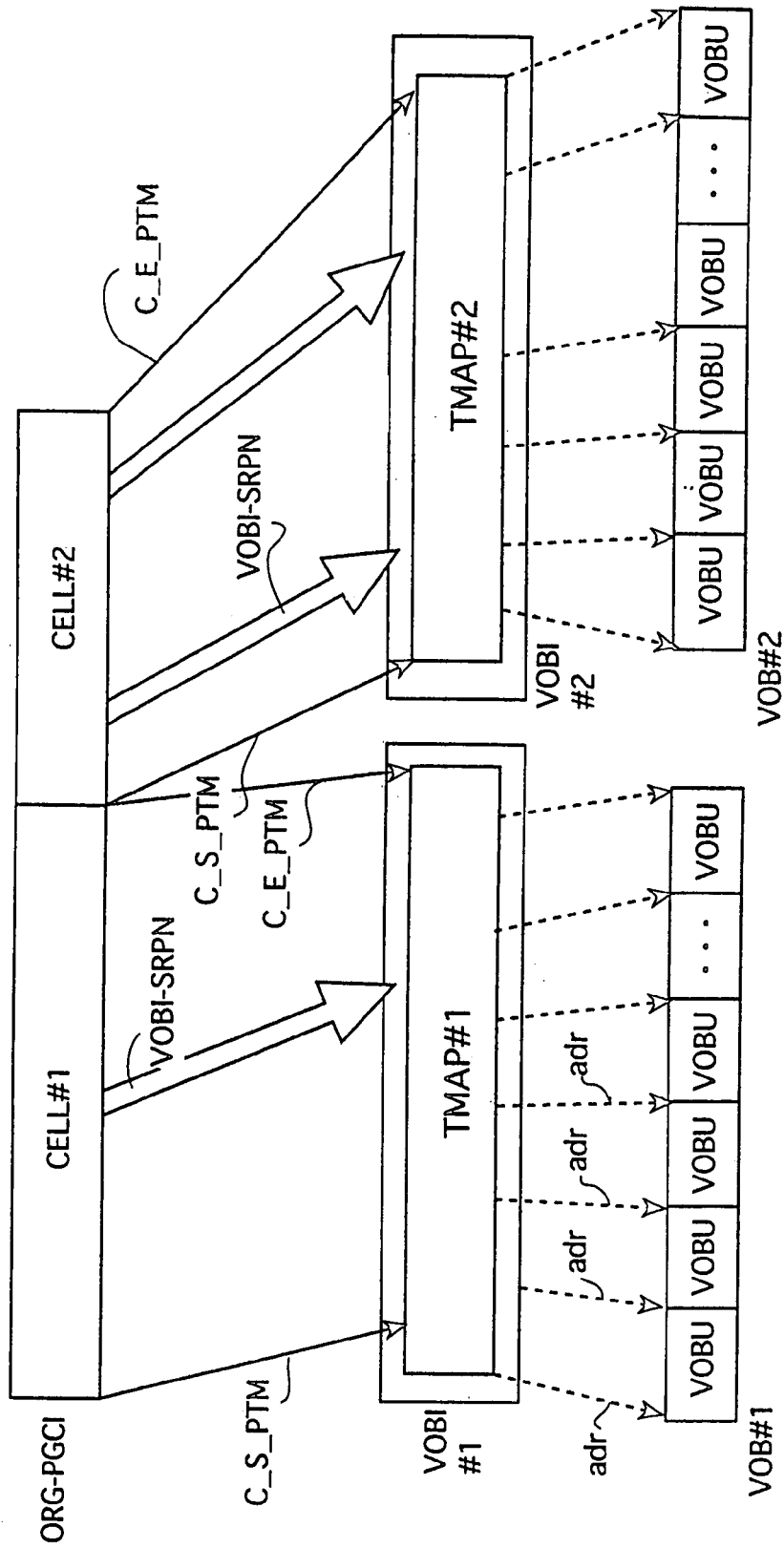
FIG. 8 shows relationships between VOBs and CELLs contained in the ORG_PGCI.

FIG. 8 shows relationships between VOBs and CELLs contained in the ORG_PGCI. In FIG. 8, the correspondence between the CELLs and the VOBIs is indicated by the VOBI_SRPN. A pair of the CELL_Start_PTM (in FIG. 8, C_S_PTM) and the CELL_End_PTM (in FIG. 8, C_E_PTM) contained in the CELL are converted into two VOBU addresses by referring to the TMAP. As a result, a section of a VOB is specified as a CELL.

The ORG_PGI is composed of, as indicated by the leader h7 shown in FIG. 7: an IT_TXT_SRPN specifying anIT_TXTI that corresponds to the PG, among a plurality of IT_TXTIs contained in the TXTDT_MG; and a C_Ns indicating the number of CELLIs contained in the PG.

Figure 9:
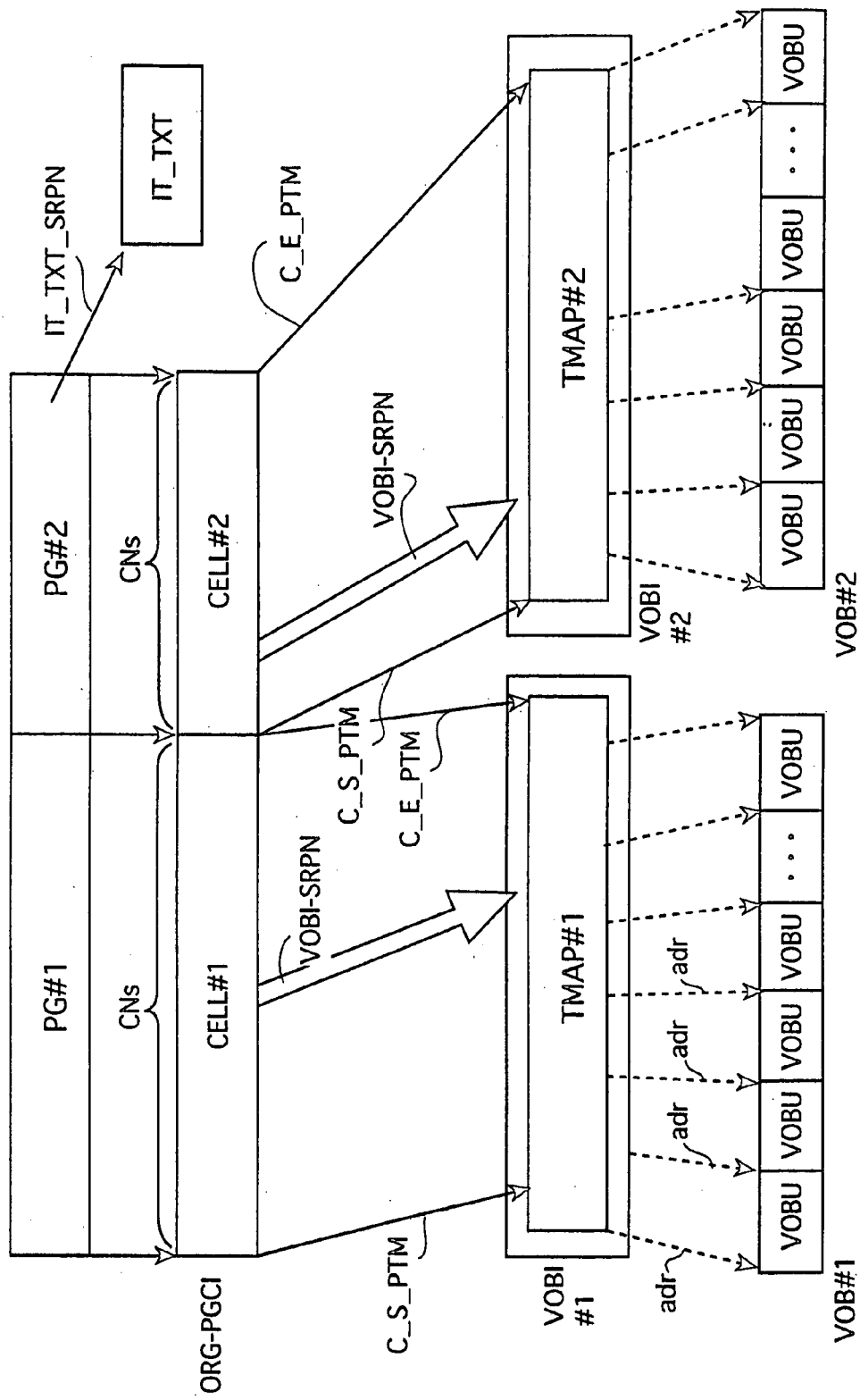
FIG. 9 shows how the CELLs shown in FIG. 7 are classified as PGs.

FIG. 9 shows how the CELLs shown in FIG. 7 are classified as PGs. As shown in FIG. 9, the CNs contained in the PGI indicates a series of CELLs belonging to PG #1, among the CELLs #1 through #2 contained in the ORG_PGCI, and a series of CELLs belonging to PG #2. Further, the IT_TXT_SRPN contained in the PG indicates the IT_TXTI that includes text data corresponding to the PG.

Figure 10:
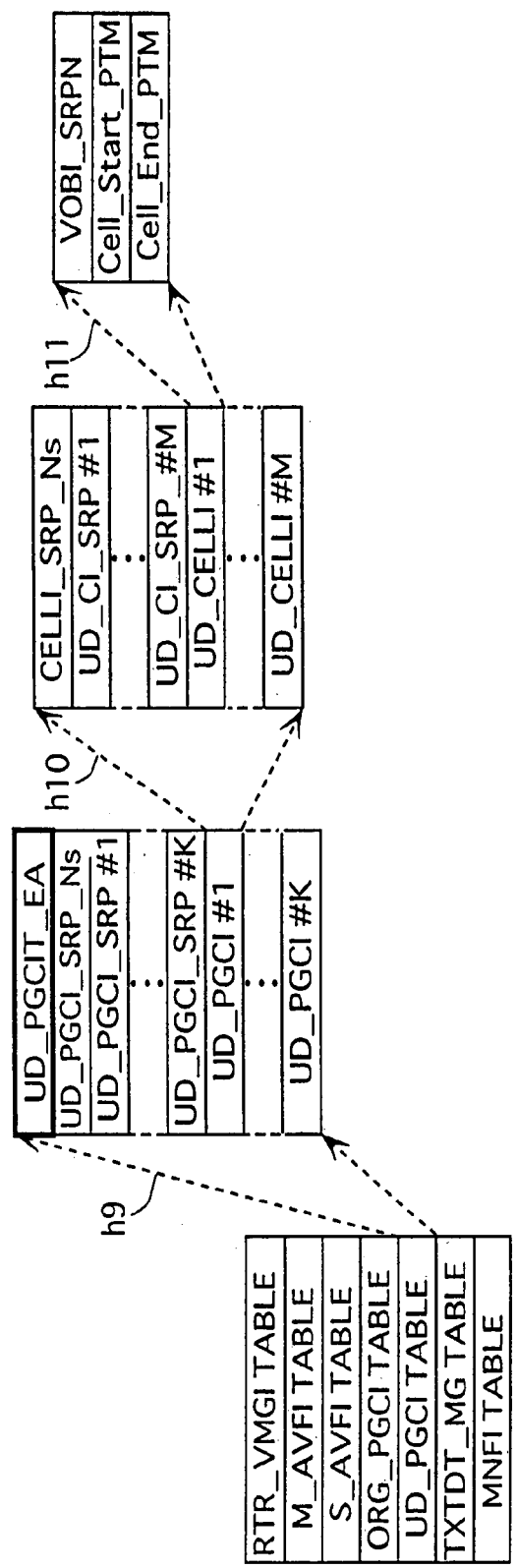
FIG. 10 shows the internal structure of the UD_PGCI table.

Up to now, the ORG_PGCI has been described. Now, the internal structure of the UD_PGCI will be described with reference to FIG. 10.

The UD_PGCIT (User Defined Program Chain Table) is composed of, as indicated by the leader h9: a UD_PGCIT_EA indicating the effective length of the UD_PGCIT; a UD_PGCI_SRP_Ns indicating the number of UD_PGCI_SRPs; a UD_PGCI_SRP #1 . . . #K each of which is a search pointer for a UD_PGCI; and user-defined PGC information UD_PGCI #1 . . . #K. The UD_PGCI is information specifying user-defined playback route information referred to as a PlayList (PL). The UD_PGCI is composed of, as indicated by the leader h10: a CELLI_S-RP_Ns indicating the number of UD_CI_SRPs; a UD_CI_SRP #1 . . . #M each of which is a search pointer for a UD_CELLI (UD_CI); and a UD_CELLI (User Defined CELL Information) #1 . . . . #M defining a playback CELL constituting the PL. The CELLI in the UD_PGCI has the same construction as the CELLI in the ORG_PGI and is composed of: a VOBI_SRPN being a search pointer for a VOBI of a VOB corresponding to the CELL; a time code CELL_Start_PTM indicating a start point of the CELL; and a time code CELL_End_PTM indicating an end point of the CELL.

Figure 11:
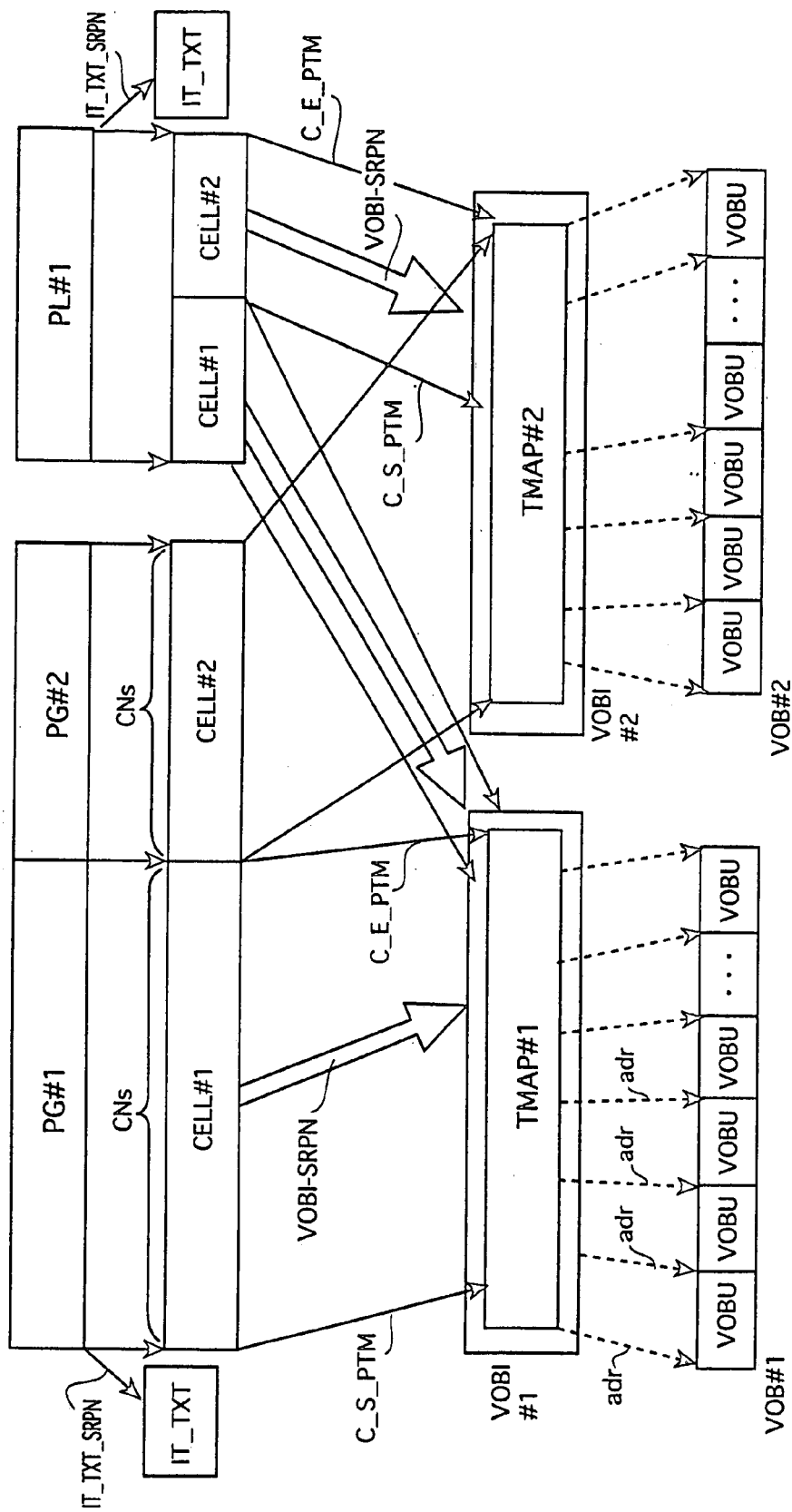
FIG. 11 shows an example of the PL defined for the VOBs and TMAPIs shown in FIG. 9.

FIG. 11 shows an example of the PL defined for the VOBs and TMAPIs shown in FIG. 9. As shown in FIG. 11, CELL #1 constituting PL #1 specifies TMAP #1 contained in VOBI #1. Further, a pair of the CELL_Start_PTM (in FIG. 11, C_S_PTM) and the CELL_End_PTM (in FIG. 11, C_E_PTM) indicates a section of VOB #1 that corresponds to CELL #1 constituting PL #1. Further, the IT_TXT_SRPN contained in the PL indicates the IT_TXTI that includes text data corresponding to the PL.

Figure 12:
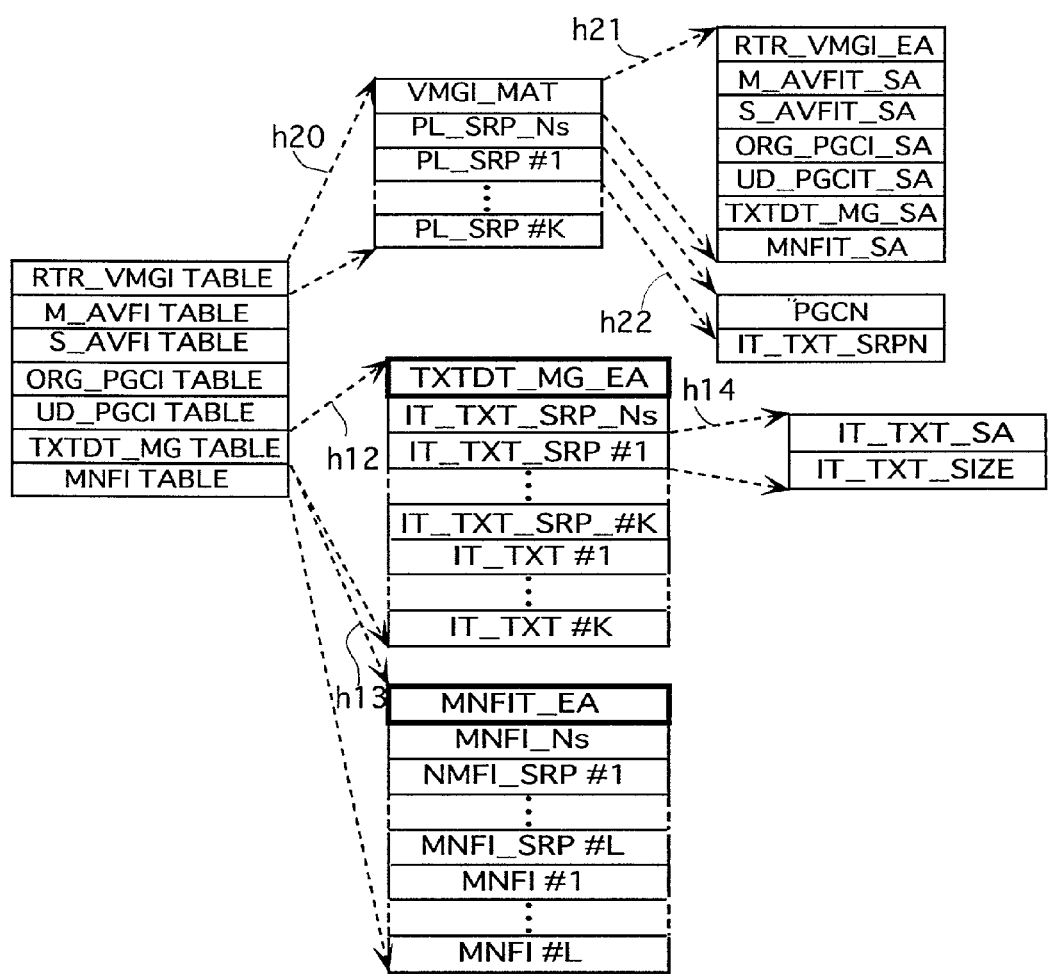
FIG. 12 shows the internal structure of the TXTDT_MG table, the MNFI table, and the RTR_VMGI table.

Now, the contents of the TXTDT_MG table, the MNFI table, and the RTR_VMGI table will be described with reference to FIG. 12.

The TXTDT_MG (Text Data Manager) table is composed of, as indicated by the leader h12: a TXTDT_MG_EA indicating the effective length of the TXTDT_MG; an IT_TXT_SRP_Ns (Item Text Search Pointer Numbers) indicating the number of the IT_TXT_SRPs; an IT_TXT_SRP (Item Text Search Pointer) #1 . . . #K that are search pointers for each IT_TXT; and an item text IT_TXT #1 . . . #K. Each IT_TXT_SRP is composed of, as indicated by the leader h14: an IT_TXT_SA (Start Address) being the start address of IT_TXT; Am IT_TXT_SZ being the size of IT_TXT; and IT_TXT being a character sequence representing, for example, a program name or a scene name defined by the user.

The MNFI table is composed of, as indicated by the leader h13: an MNFI_EA indicating the effective length of the MNFIT; an MNFI_Ns indicating the number of MNFIs; an MNFI #1 . . . #L in which information unique to each recording/playback apparatus is written. The information unique to each recording/playback apparatus is, for example, pointer information used to write an entry point concerning a thumbnail image or an entry point of thumbnail.

The RTR_VMGI (Real Time Recording Video Management General Information) table is composed of, as indicated by the leader h20: a VMGI_MAT (Real Time Recording Video Management General Information Map Table); a PL_SRP_Ns indicating the number of the playlist search pointers set for the DVD-RAM; and a PL_SRP #1 . . . #K. The VMGI_MAT is composed of, as indicated by the leader h21: an RTR_VMGI_EA indicating the effective length of the RTR_VMGI table; and an M_AVFIT_SA, an S_AVFIT_SA, an ORG_PGCI_SA, an UD_PGCIT_SA, a TXTDT_MG_SA, and an MNFIT_SA which are the start addresses of the management tables.

The PL_SRP is composed of, as indicated by the leader h22: a PGCN indicating a user-defined PGC corresponding to the PL; and an IT_TXT_SRPN being a pointer specifying a text corresponding to the PL.

Figure 13:
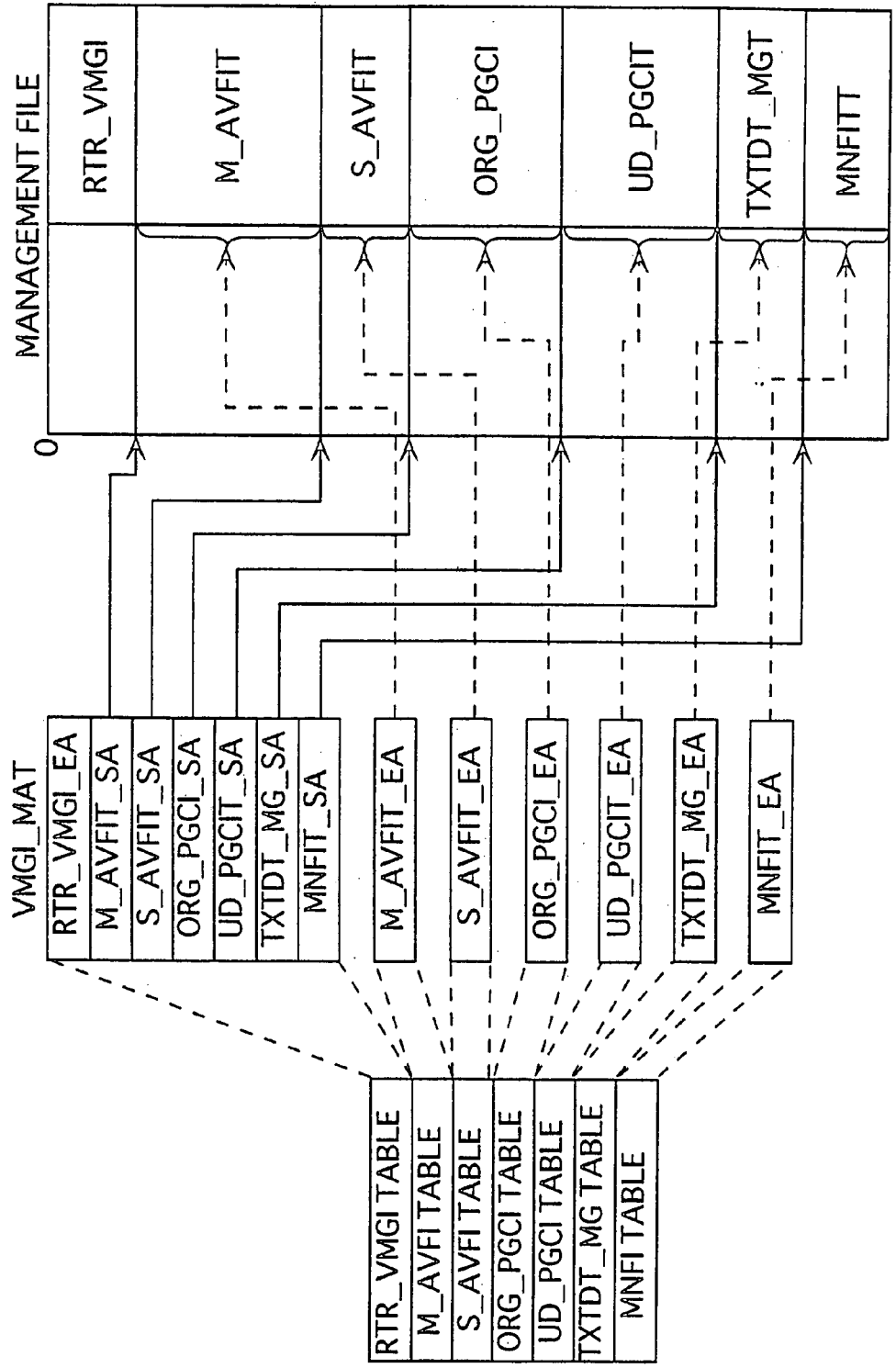
FIG. 13 indicates how the location and size of each management table are determined from the start addresses (the M_AVFIT_SA through the MNFIT_SA) written on the VMGI_MAT and the effective lengths (the M_AVFIT_EA through the MNFIT_EA) written on the management tables.

FIG. 13 indicates how the location and size of each management table are determined from the start addresses (the M_AVFIT_SA through the MNFIT_SA) written on the VMGI_MAT and the effective lengths (the M_AVFIT_EA through the MNFIT_EA) written on the management tables. The ranges indicated by the sign "{" in FIG. 13 indicate the locations and sizes of the management tables determined from the start addresses and the effective lengths. The start addresses (the M_AVFIT_SA through the MNFIT_SA) of the management tables written on the VMGI_MAT are each an offset from the start of the management file to the start of each management table. The effective lengths (the M_AVFIT_EA through the MNFIT_EA) of the management tables are each an offset from the start to the end of the management table, where the start is "0". Accordingly, the end address of each management table is obtained by adding the effective length written on the management table to the start address of the management table written on the VMGI_MAT of the RTR_VMGI.

If the start address and the effective length are correct, the obtained end address of a management table is equal to or smaller than the start address of the next management table. If the start address and the effective length are incorrect, the obtained end address is greater than the start address of the next management table, meaning that these management tables overlap.

Figure 14:
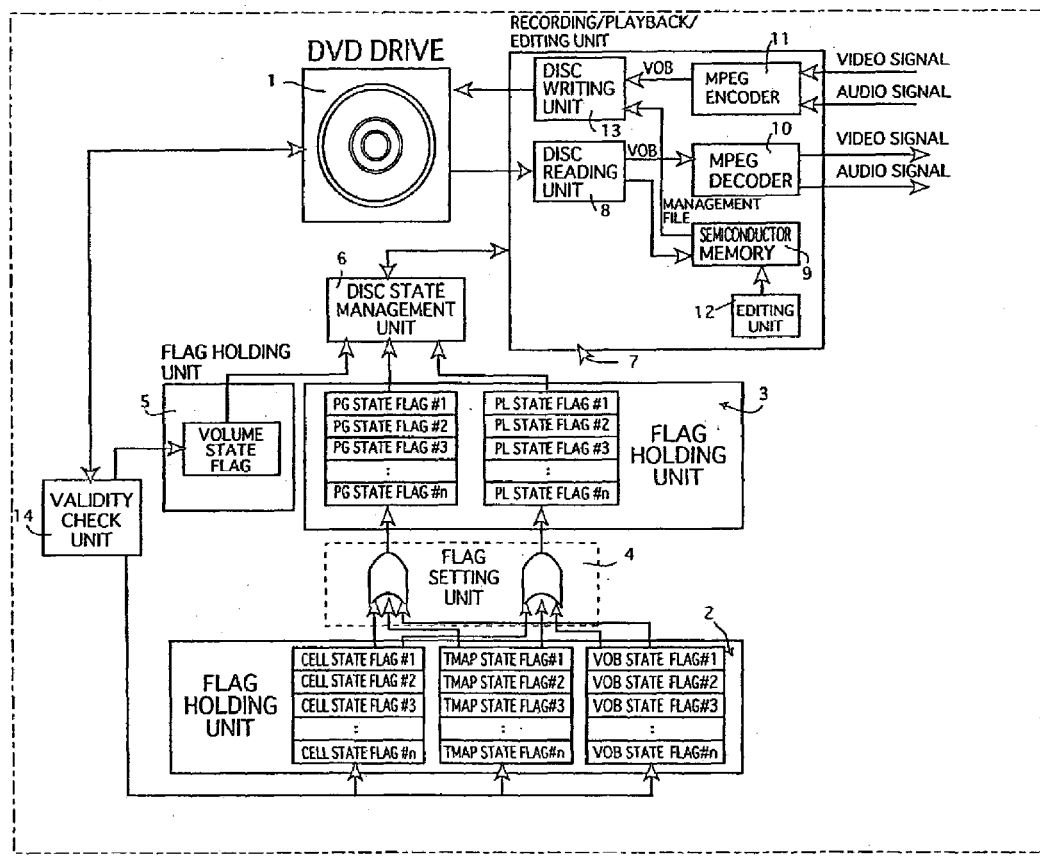
FIG. 14 shows the internal structure of the recording/playback apparatus.

Up to now, the data structure of the DVD has been described. From now on, the internal structure of the recording/playback apparatus will be described. FIG. 14 shows the internal structure of the recording/playback apparatus. As shown in FIG. 14, the recording/playback apparatus includes a DVD drive 1, a flag holding unit 2, a flag holding unit 3, a flag setting unit 4, a flag holding unit 5, a disc state management unit 6, a recording/playback/editing unit 7 (which contains a disc reading unit 8, a semiconductor memory 9, an MPEG decoder 10, and MPEG encoder 11, an editing unit 12, and a disc writing unit 13), and a validity check unit 14.

The DVD drive 1 sets a DVD, to/from which data is written or read and played back, to the state in which the DVD can be accessed.

Figure 15A:
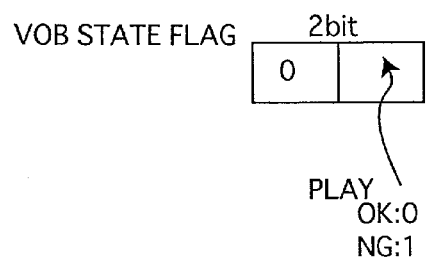
FIGS. 15A to 15C show bit assignments of the VOB state flags, CELL state flags, and TMAP state flags.

The flag holding unit 2 holds: a plurality of VOB state flags indicating the state of a plurality of VOBs recorded on the DVD; a plurality of CELL state flags indicating the state of a plurality of CELLs contained in the management file; and a plurality of TMAP state flags indicating the state of a plurality of TMAPIs. Each VOB state flag indicates whether a corresponding VOB can be played back or not. Each CELL state flag indicates whether a corresponding CELL can be played back or not. Each TMAP state flag indicates whether a corresponding TMAPI can be edited or not. These VOB, CELL, and TMAP state flags have bit assignments common to each other, as shown FIGS. 15A to 15C. Each flag consists of 2 bits. When the first bit is "0", it indicates that the object can be played back; and when the first bit is "1", it indicates that the object cannot be played back. When the second bit is "0", it indicates that the object can be edited; and when the second bit is "1", it indicates that the object cannot be edited.

Figure 15D:
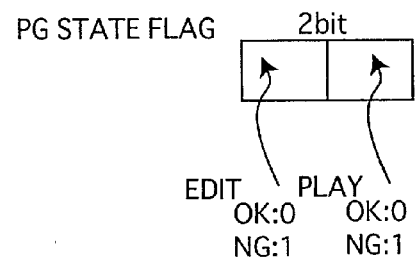
FIGS. 15D and 15E show bit assignments of the PG state flags and the PL state flags.
Figure 15B:
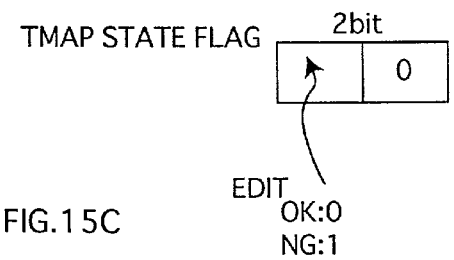
Figure 15E:
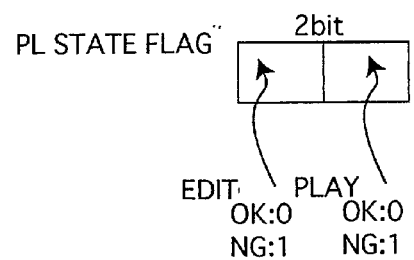
Figure 15C:
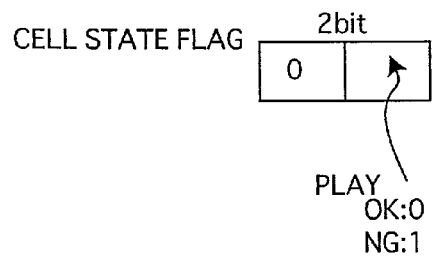

The flag holding unit 3 holds: a plurality of PG state flags indicating the state of a plurality of PGs recorded on the DVD; and a plurality of PL state flags indicating the state of a plurality of PLs recorded on the DVD. FIG. 15D shows the bit assignment of the PG state flag. As shown in FIG. 15D, the PG state flag consists of 2 bits. When the first bit is "0", it indicates that the object can be played back; and when the first bit is "1", it indicates that the object cannot be played back. When the second bit is "0", it indicates that the object can be edited; and when the second bit is "1", it indicates that the object cannot be edited. FIG. 15E shows the bit assignment of the PL state flag. The bit assignment is the same as that of the PG state flag shown in FIG. 15D.

The flag setting unit 4 sets the PG state flags by implementing the logical OR operation between the CELL state flags corresponding to all CELLIs specified by the CNs contained in the PGI, the VOB state flags corresponding to all VOBs specified by the VOBI_SRPN of these CELLIs, and the TMAP state flags corresponding to the TMAPIs corresponding to these VOBs. Also, the flag setting unit 4 sets the PL state flags by implementing the logical OR operation between the CELL state flags corresponding to all CELLIs contained in the PLs, the VOB state flags corresponding to all VOBs specified by the VOBI_SRPN of these CELLIs, and the TMAP state flags corresponding to the TMAPIs corresponding to these VOBs. Now, how the PG and PL state flags are set in the case of PG #1, PG #2, and PL #1 shown in FIG. 11 will be described. As shown in FIG. 11, the PGCI contains two CELLs #1 and #2. It is supposed here that the CELL state flags for these CELLs are all "00". It is also supposed here that the VOBI_SRPNs of these CELLIs specify VOBs #1 and #2, that the VOB state flags corresponding to these VOBs are "00" and "01", that VOBs #1 and #2 correspond to TMAPIs #1 and #2, and that the TMAP state flags corresponding to these TMAPIs are "00" and "00". The PG state flags and the PL state flag corresponding to PG #1, PG #2, and PL #1 are obtained by implementing the logical OR operations shown in FIG. 16. The results of these logical OR operations are as follows.

The PG state flag #1 for PG #1 = 00 ∪ 00 ∪ 01 = 01

The PG state flag #2 for PG #2 = 00 ∪ 00 ∪ 00 = 00

The PL state flag #1 for PL #1 = 00 ∪ 00 ∪ 00 ∪ 00 ∪ 01 ∪ 00

= 01

Figure 17:
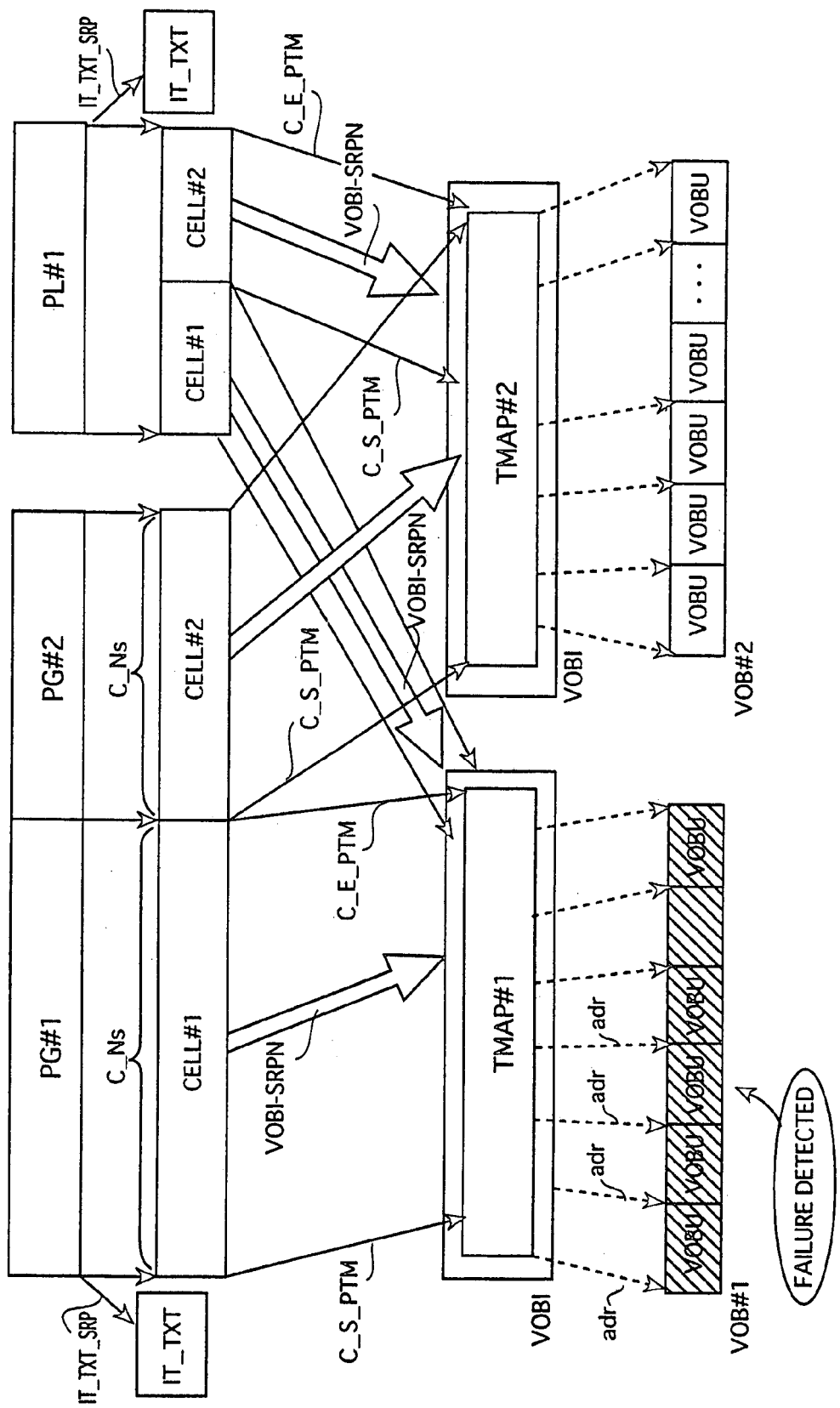
FIG. 17 shows an example of a failure found in a VOB.
Figure 18:
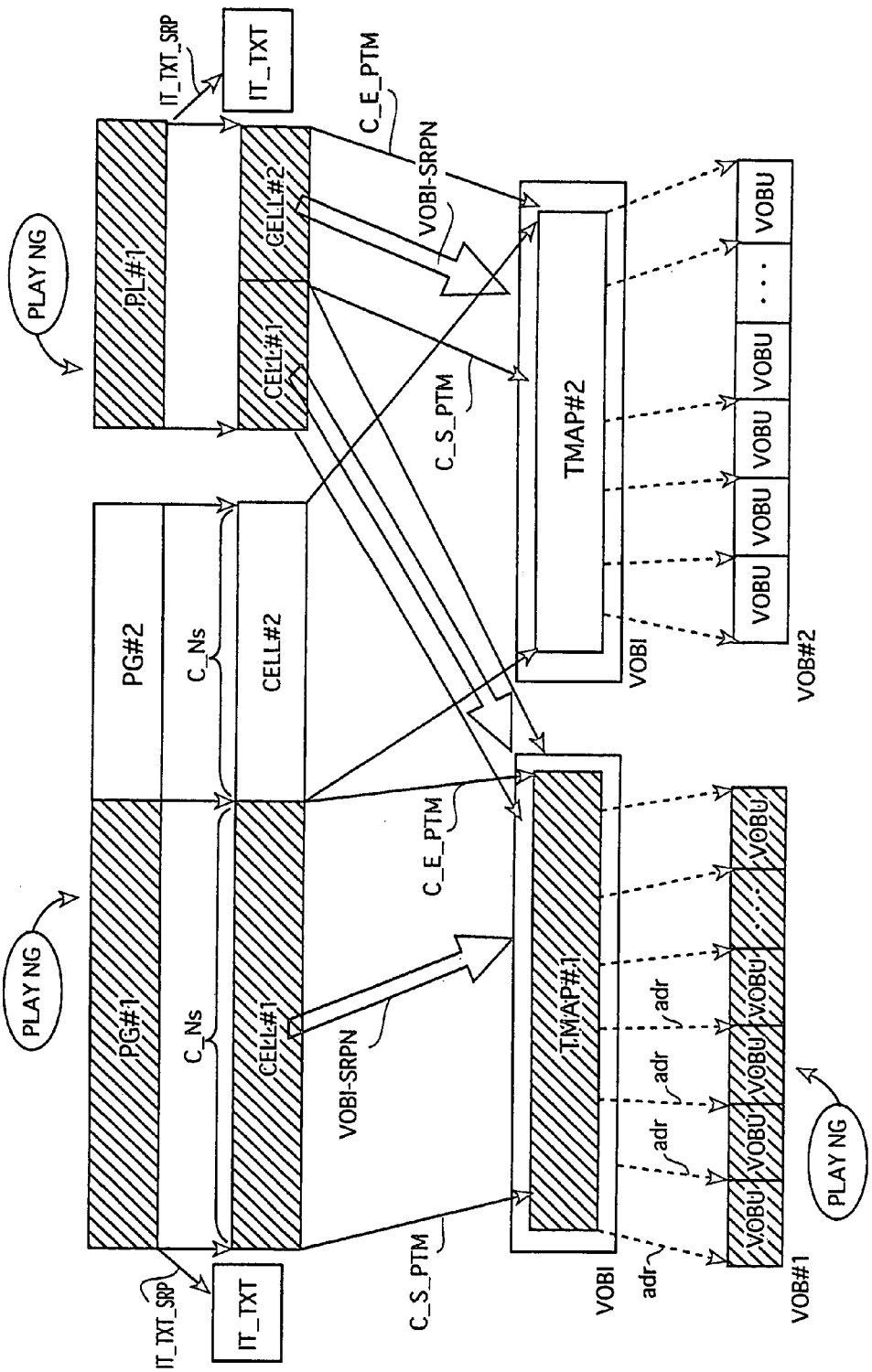
FIG. 18 shows how PGs or PLs referring to a VOB with a failure are set to "playback not available"

As understood from this, when a failure is found in a VOB as shown in FIG. 17 and when the VOB state flag corresponding to the failure VOB is set to "Play NG" that indicates "playback not available", PG #1 and PL #1 referring to the VOB are set to "Play NG" as shown in FIG. 18.

Figure 19:
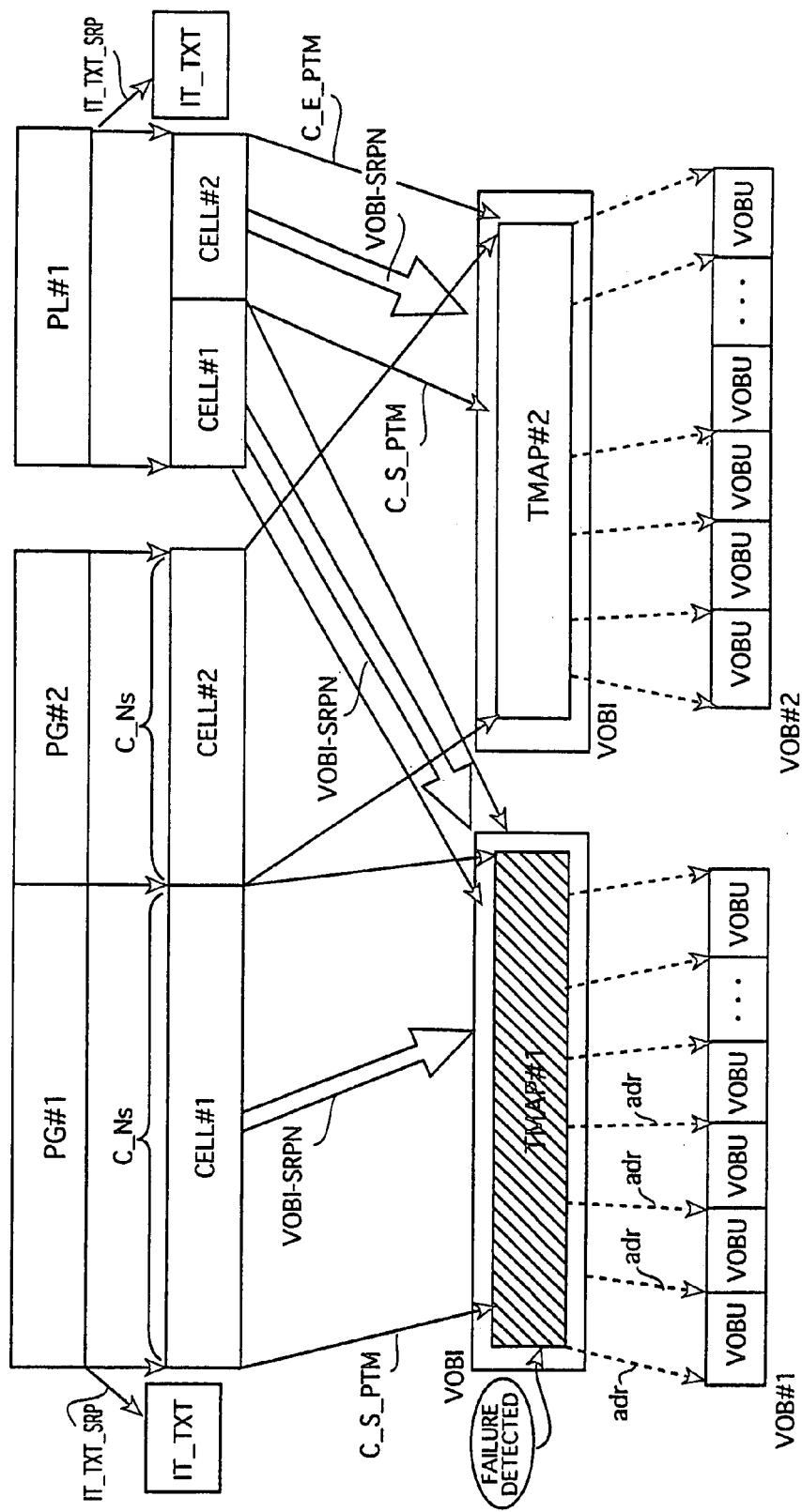
FIG. 19 shows an example of a failure found in a TMAPI.
Figure 20:
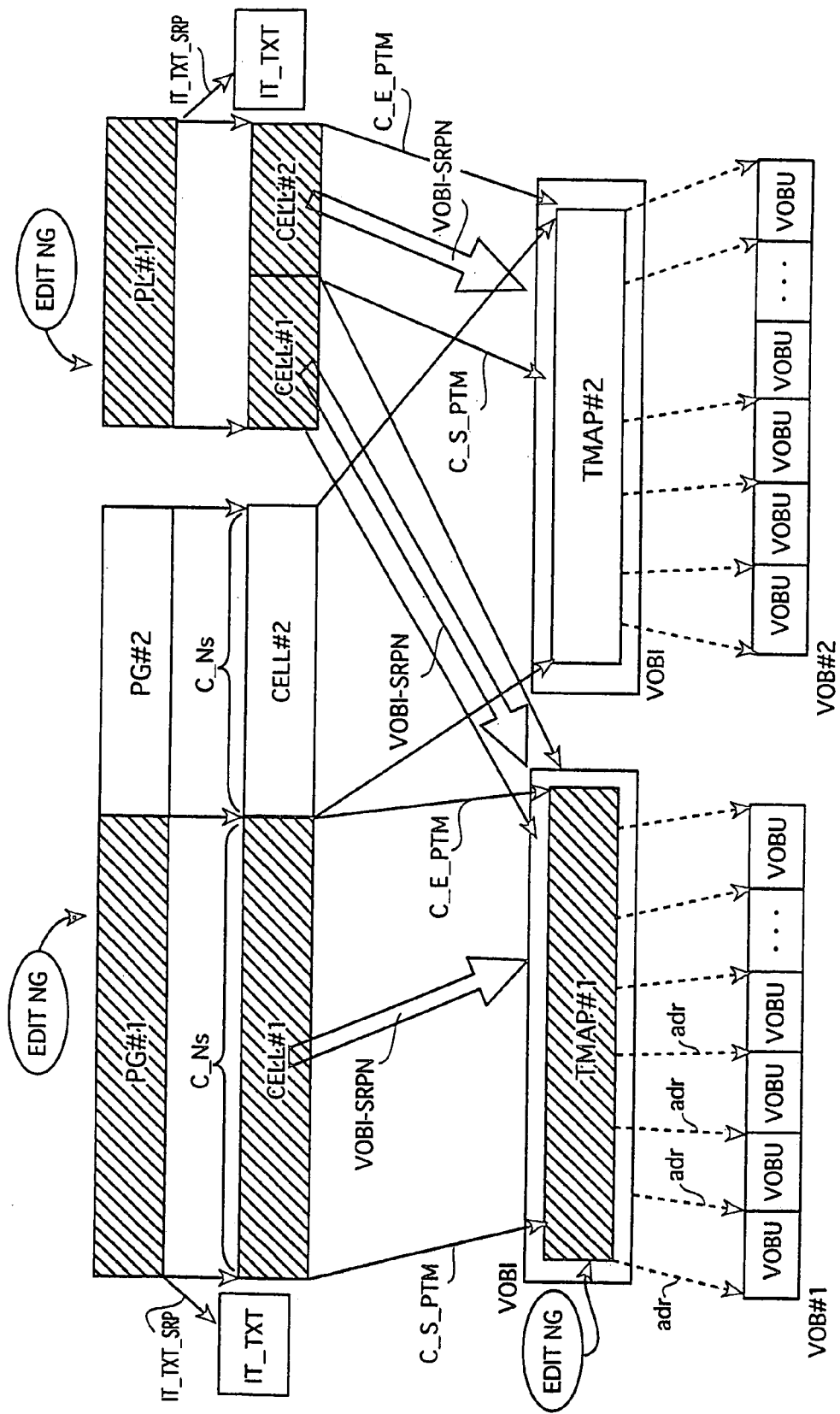
FIG. 20 shows how PGs or PLs referring to a TMAPI with a failure are set to "playback not available"

Similarly, when a failure is found in a TMAPI as shown in FIG. 19 and when the TMAP state flag corresponding to the failure TMAPI is set to "Edit NG" that indicates "editing not available", PG #1 and PL #1 referring to the TMAPI are set to "Edit NG" as shown in FIG. 20.

Figure 21:
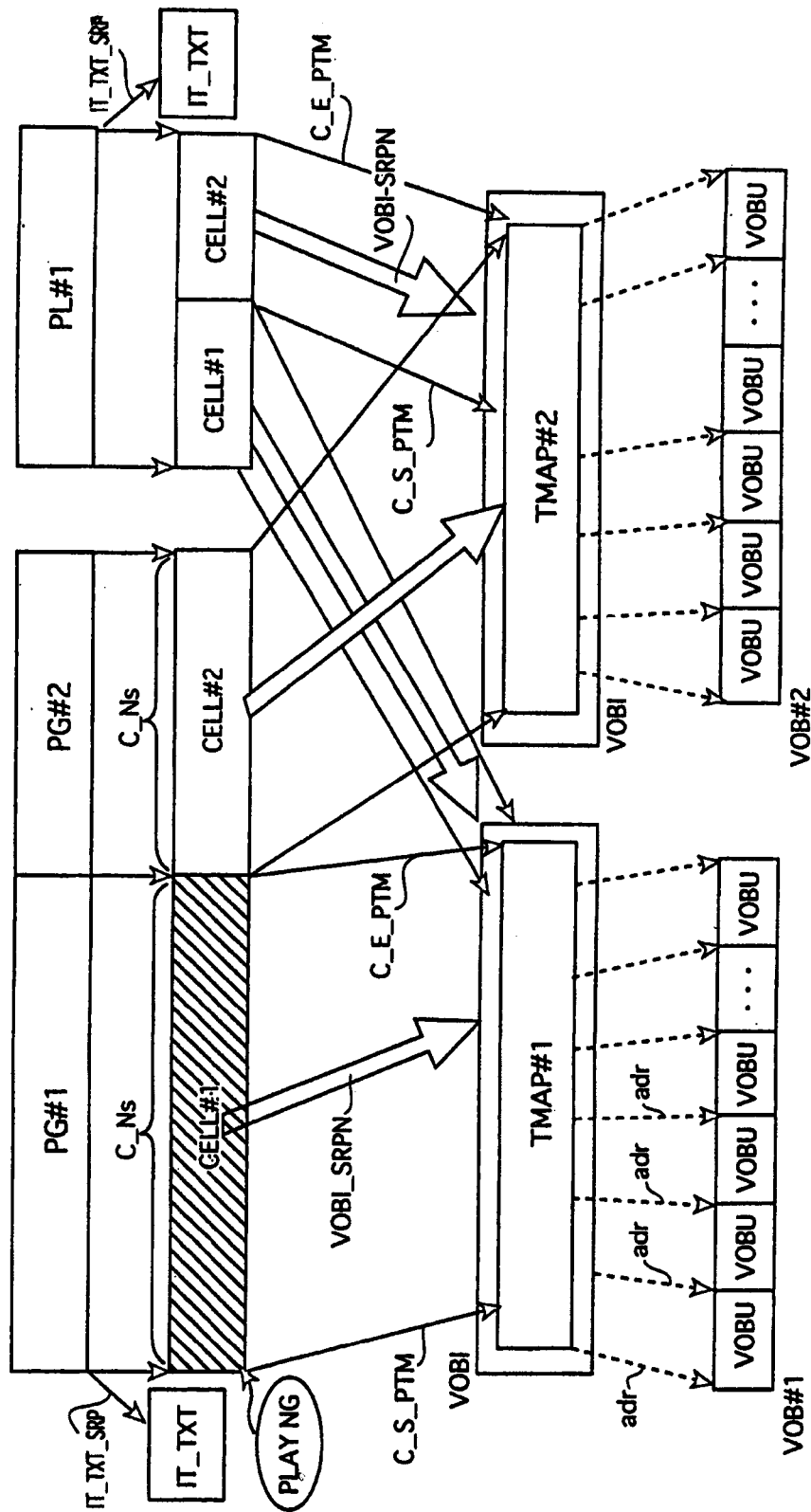
FIG. 21 shows an example of a failure found in a CELL constituting a PG.
Figure 22:
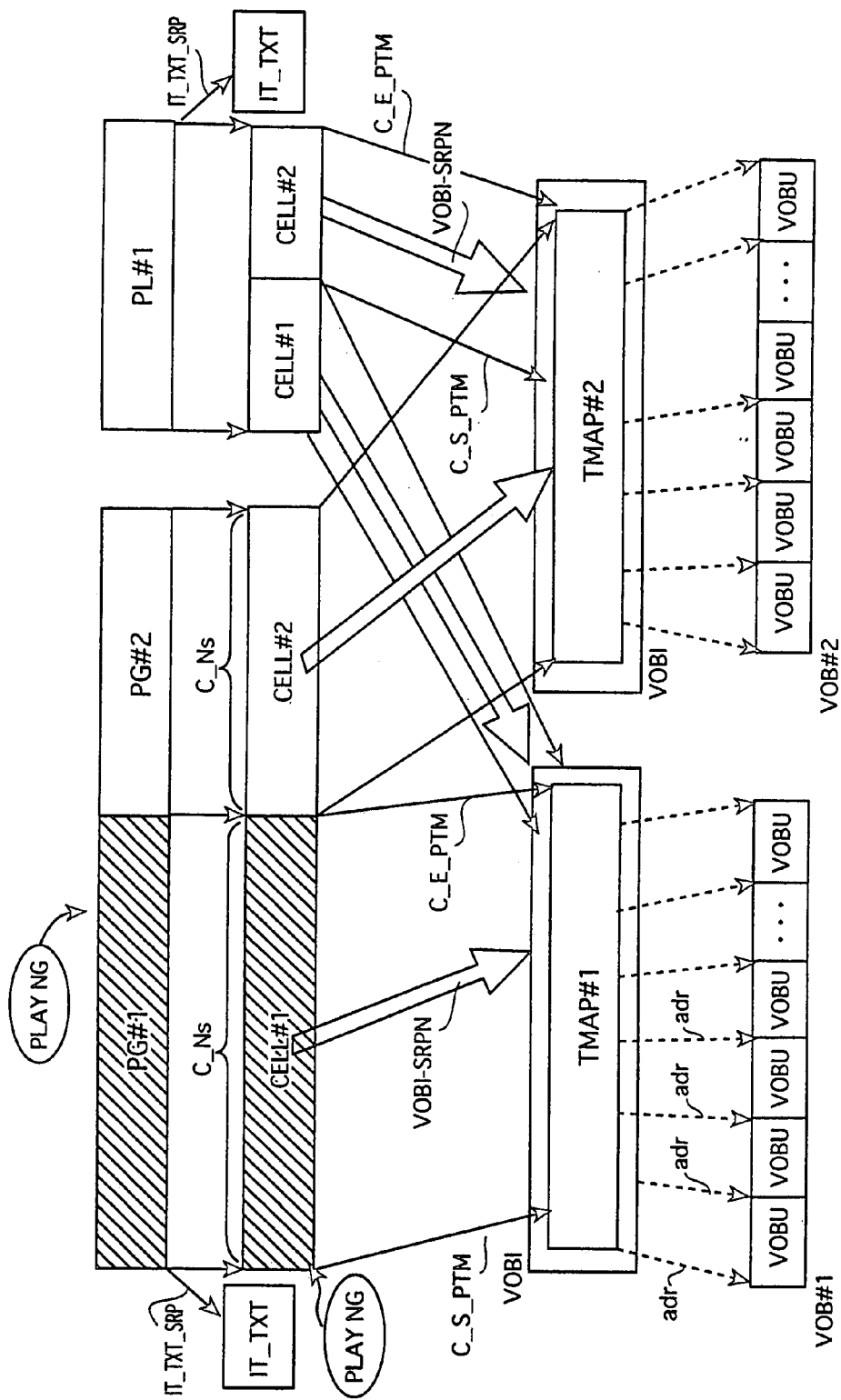
FIG. 22 shows how a PG containing a CELL with a failure is set to "playback not available"

On the other hand, when a failure is found in a CELL contained in a PG or a PL, only the PG or the PL containing the failure CELL are set to "Play NG", and other PGs and PLs not containing the CELL are not set so. That is to say, the failure does not affect the other PGs and PLs. More specifically, when a failure is found in the CELLs constituting PG #1 as shown in FIG. 21, only PG #1 is set to "Play NG" and PG #2 and PL #1 are set to "Play OK" that indicates "playback available", not affected by the failure. When a failure is found in a VOB or a TMAPI, all PGs and PLs referring to the VOB or the TMAPI are set to "Play NG" or "Edit NG". This prevents mulfunctions of the playback process and the editing process for PGs and PLs based on the found failure.

Figure 23:
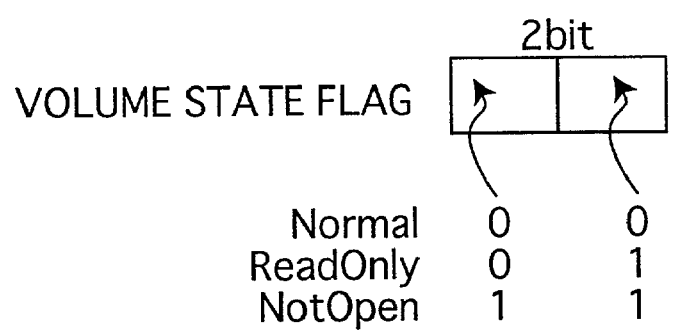
FIG. 23 shows the bit assignment of the volume state flag.

The flag holding unit 5 holds a plurality of volume state flags indicating the state of management files recorded on the DVD. FIG. 23 shows the bit assignment of the volume state flag. As shown in FIG. 23, the volume state flag consists of 2 bits and indicates "Not Open" when the bits are "11", "Read Only" when the bits are "01", and "Normal" when the bits are "00", where "Not Open" indicates that data cannot be read nor written from/to the DVD inserted in the DVD drive 1, "Read Only" indicates that the DVD is in the read-only state, and "Normal" indicates that data can be read or written from/to the DVD.

Figure 24:
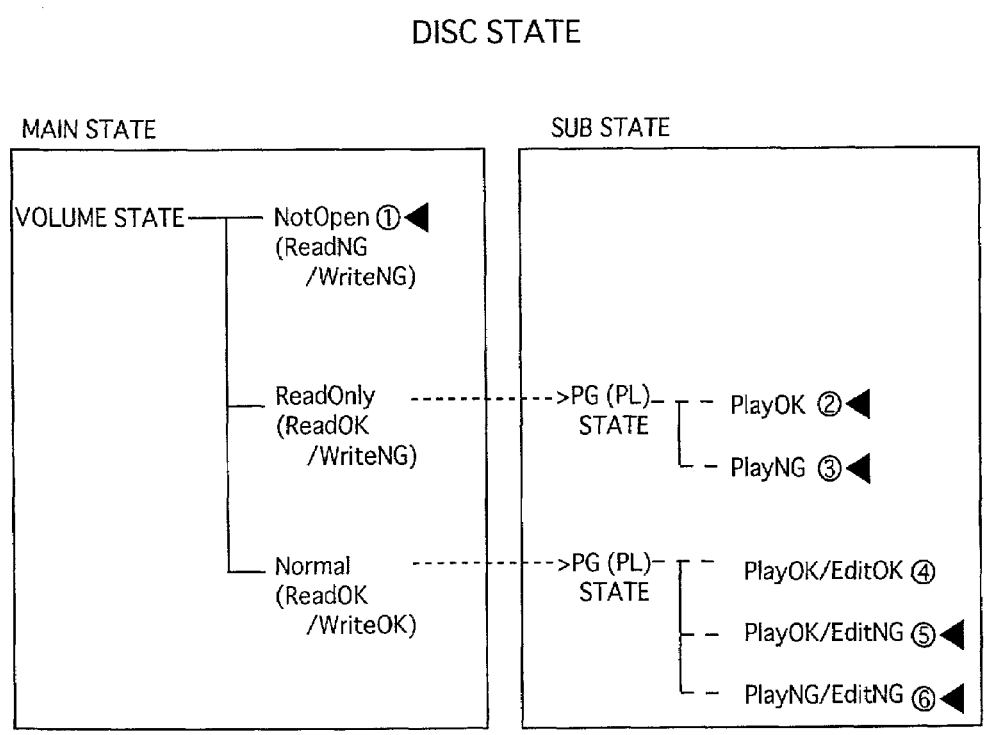
FIG. 24 shows various disc states represented by the combination of the volume state flag and the PG (PL) state flag.

The disc state management unit 6 manages the disc state regarding the state indicated by the volume state flag as the main state, and the state indicated by the PG (PL) state flag as the sub state. FIG. 24 shows various disc states represented by the combination of the volume state flag and the PG (PL) state flag. As shown in FIG. 24, there are 6 disc states: (1) "Not Open" where data cannot be read nor written from/to the DVD; (2) "ReadOnly" where PGs (PLs) can be played back; (3) "ReadOnly" where the PGs (PLs) cannot be played back; (4) "Normal" where data can be read and written from/to the DVD and PGs (PLs) can be played back and edited; (5) "Normal" where data can be read and written from/to the DVD, PGs (PLs) can be played back but cannot be edited; and (6) "Normal" where PGs (PLs) cannot be played back nor edited. When a failure is found in the DVD, the disc state becomes one of (1), (2), (3), (5), and (6) indicated by the triangle mark, depending on the seriousness of the failure.

The recording/playback/editing unit 7 executes the reading and writing data from/to the DVD inserted in the DVD drive 1 and executes the playback and editing of PGs and PLs recorded on the DVD, depending on the disc state managed by the disc state management unit 6. More particularly, the recording/playback/editing unit 7 contains the disc reading unit 8 that reads a VOB and the management file when the volume state flag is set to "Normal" or "ReadOnly", the semiconductor memory 9 that stores the management file read from the DVD, the MPEG decoder 10 that decodes the VOB read from the DVD and outputs an image signal and an audio signal when the PG state flag or PL state flag is set to "Play OK", the MPEG encoder 11 that obtains a VOB by encoding an image signal and an audio signal input from outside the apparatus when the volume state flag is set to "Normal", the editing unit 12 that edits the management file stored in the semiconductor memory 9 in accordance with a user's instruction when the PG state flag is set to "Edit OK", and the disc writing unit 13 that writes (1) the edited management file and (2) the VOB encoded by the MPEG encoder 11 onto the DVD when the volume state flag is set to "Normal".

The validity check unit 14 checks whether the data structure of the management file and VOBs recorded on the DVD are valid. Here, being valid means that the data structure of the DVD conforms to the DVD-VIDEO RECORDING standard of a version to which the recording/playback apparatus is adaptable. As a result, the data structure is judged as invalid not only when the DVD has a portion violating the DVD-VIDEO RECORDING standard but when the DVD conforms to the DVD-VIDEO RECORDING standard of a version higher than the version to which the recording/playback apparatus is adaptable.

Figure 25:
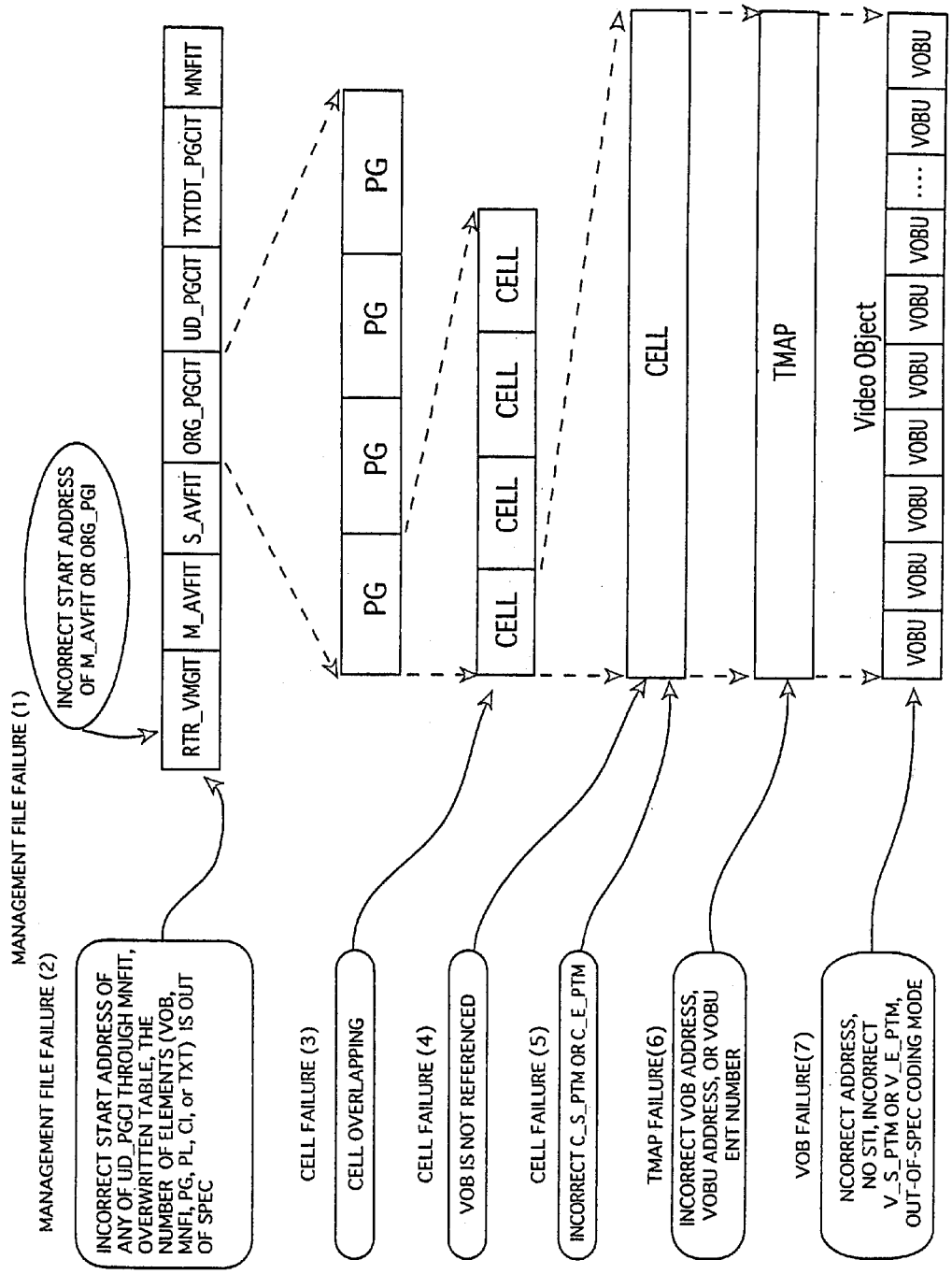
FIG. 25 shows empirically known failures to be found in the data structure conforming to the DVD-VIDEO RECORDING standard.

FIG. 25 shows empirically known failures to be found in the data structure conforming to the DVD-VIDEO RECORDING standard. The management file failures (1) and (2) are thought to be found in the data structure of the management file. The CELL failures (3), (4), and (5) are thought to be found in the CELLIs. The TMAP failure (6) is thought to be found in the TMAPIs. The VOB failure (7) is thought to be found in the VOBs. These failures are empirically expected to be found in the DVD. The management file failure (1) means that the start address of the M_AVFIT or the ORG_PGI, which are what is called playback information tables, is incorrect. The management file failure (2) means that (a) the start address of any of the UD_PGCI through the MNFIT is incorrect, (b) the table has been overwritten, or (c) the number of elements such as VOBs, MNFIS, PGs, PLs, CIs, or TXTs is out of specifications. The CELL failure (3) means that a VOB specified by a CELLI constituting a PG overlaps with a VOB specified by another CELLI constituting a PG. The CELL failure (4) means that a CELLI that does not refer to a VOB has been recorded. The CELL failure (5) means that a CELLI with incorrect C_S_PTM or C_E_PTM has been recorded. The TMAP failure (6) means that a TMAPI with incorrect VOB address, VOBU address, or VOBU number has been recorded. The VOB failure (7) means that (a) a VOB address is incorrect, (b) no corresponding STI is found, (c) a pair of a VOB_Start PTM and a VOB_End_PTM is incorrect, or (d) a video or audio stream constituting a VOB has been encoded in an out-of-spec coding mode.

It should be noted here that the incorrect VOB address, VOBU address, and VOBU number mean, for example, that a VOBU address or number has been replaced with the preceding or succeeding one, that a VOBU address exceeds the file size, or that a VOBU number is "0".

The above failures are assigned with priority levels as shown in FIG. 26A. The disc state is determined in consideration of the priority levels. The highest priority level is given to the management file failure (1). The second priority level is given to the management file failure (2) and the CELL failures (3) and (4). The third priority level is given to the CELL failure (5), the TMAP failure (6), and the VOB failure (7).

When a plurality of failures is found, the disc state is determined based on the highest priority level among those assigned to the found failures. In other words, the disc state is determined based on the CELL failure (5), the TMAP failure (6), or the VOB failure (7) when no failure with a higher priority level is found. FIG. 26B is a table that shows how the disc state is determined from found failures in consideration of the priority levels shown in FIG. 26A. The table shown in FIG. 26B indicates that the volume state flag is set to "NotOpen" when the management file failure (1) with the first priority level is found, that the volume state flag is set to "ReadOnly" when any of the management file failure (2), and the CELL failures (3) and (4) with the second priority level is found, and that the CELL state flag, the TMAP state flag, or the VOB state flag is set to "Play NG", "Edit NG", or "Play NG" when the CELL failure (5), the TMAP failure (6), or the VOB failure (7) with the third priority level is found, respectively. It should specifically be noted in FIG. 26B that when any of the CELL failure (5), the TMAP failure (6), and the VOB failure (7) is found and none of the management file failures (1) and (2) and the CELL failures (3) and (4) is found, the volume state flag is not affected. That means when only any of the CELL failure (5), the TMAP failure (6), and the VOB failure (7) is found, reading and writing data from/to the DVD can be performed without restriction.

The validity check unit 14 includes (a) a program in which the procedures shown as flowcharts in FIGS. 27 through 36 are written and (b) a general-purpose microcomputer for executing the procedures. Now, the procedures of the validity check unit 14 will be described with reference to the flowcharts.

Figure 27:
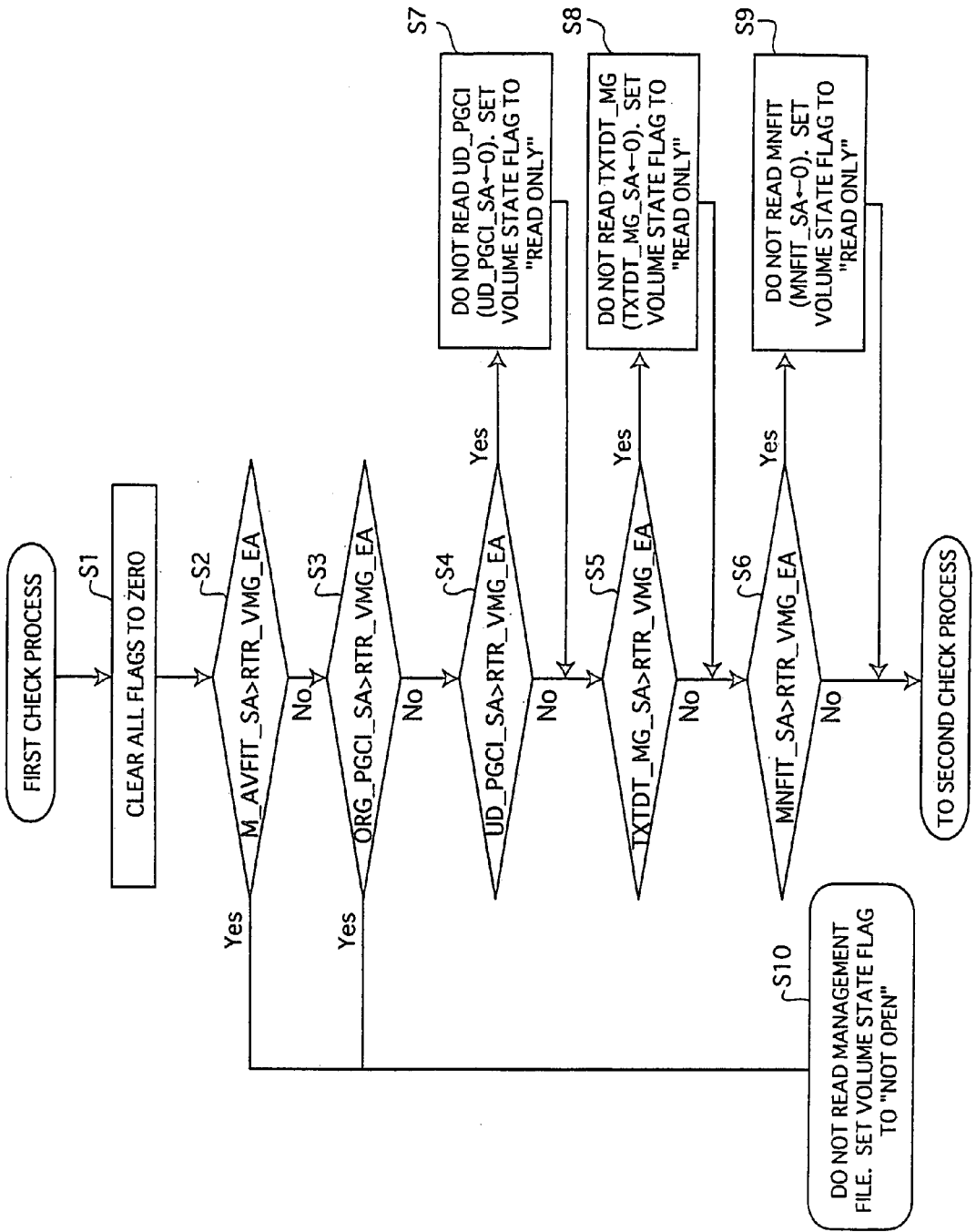
FIG. 27 is a flowchart showing the procedure of the first check process for the management file.

FIG. 27 is a flowchart showing the procedure of the first check process for the management file. In step S1, all flags are cleared to zero, then in steps S2 through S6, it is judged whether the start address of each table exceeds the management file effective length RTR_VMG_EA. In steps S2 and S3, it is judged whether the management file failure (1) exists. In steps S4 through S6, it is judged whether the management file failure (2) exists.

When it is judged that the M_AVFIT_SA or the ORG_PGCIT_SA exceeds the RTR_VMG_EA ("YES" in step S2 or S3), the control moves to step S10 where the volume state flag is set to "NotOpen", without reading the management file onto the memory.

When it is judged that the UD_PGCI_SA, TXTDT_MG_SA, or MNFIT_SA exceeds the RTR_VMG_EA ("YES" in step S4, S5, or S6), the control moves to step S7, S8, or S9, respectively, and the volume state flag is set to "ReadOnly", and a table other than the tables with a failure (UD_PGCI_SA, TXTDT_MG_SA, and MNFIT_SA) is read onto the semiconductor memory 9 to end the first check process and move to the second check process.

Figure 28:
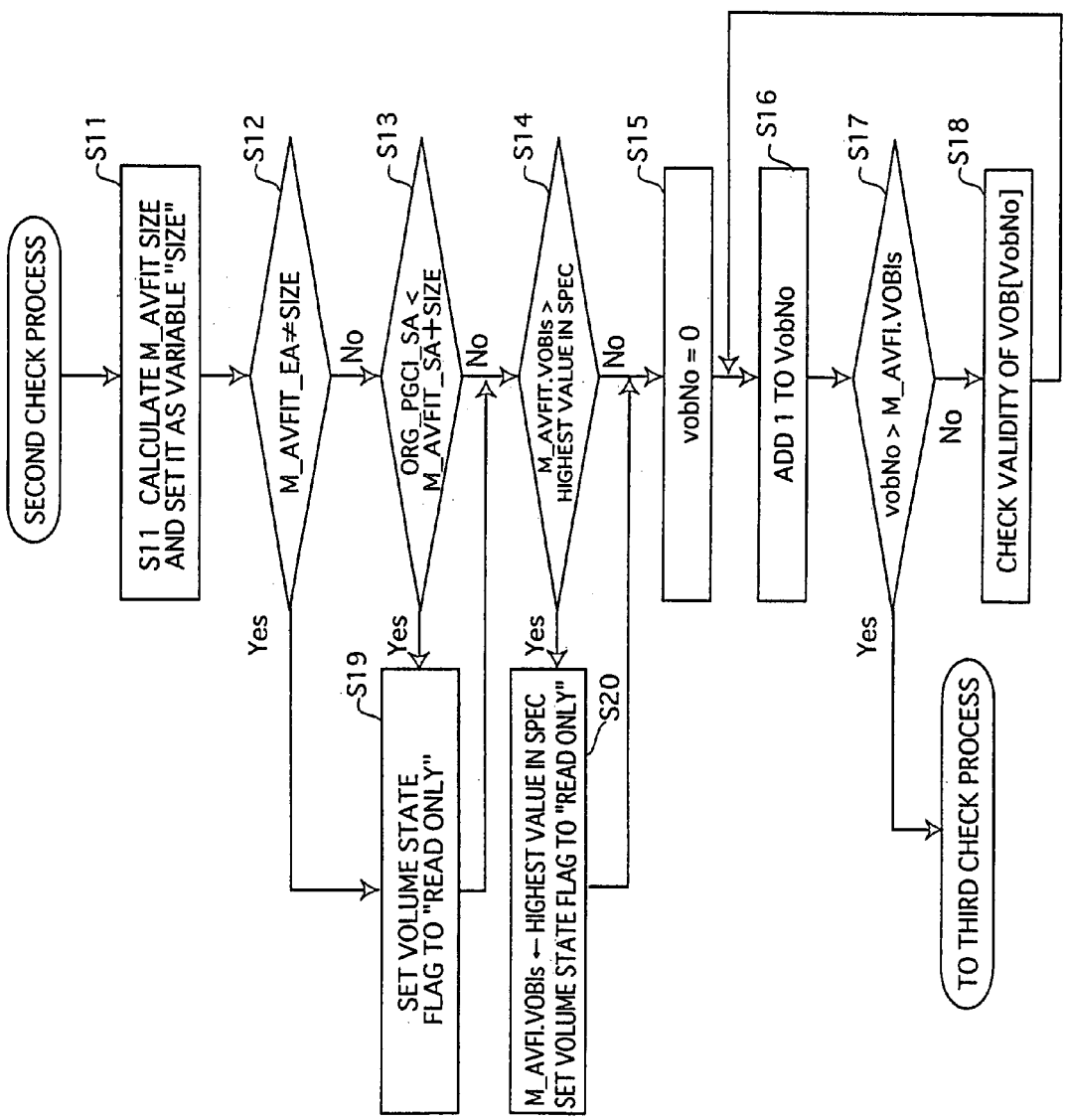
FIG. 28 is a flowchart showing the procedure of the second check process.

FIG. 28 is a flowchart showing the procedure of the second check process. The second check process checks the validity of the M_AVFIT. In step S11, the size of the M_AVFIT is calculated and the obtained size is set as a variable "SIZE". Here, the size of the M_AVFIT is calculated using the size of each table constituting the M_AVFIT and the number of elements in each table. The size of each table is defined in the DVD-VIDEO RECORDING standard. The number of elements in each table is managed by each table. For example, the size of the VOB_STI table is 60 bytes, and the number of elements is indicated by the VOB_STI_Ns of the M_AVFIT. Using these information, the size of theM_AVFIT is calculated as follows.

$$\text{SIZE} = 2(= \text{size of VOB\_STI\_Ns}) + 4(= \text{size of M\_AVFIT\_EA}) +$$
$$60(= \text{size of VOB\_STI}) \times \text{VOB\_STI\_Ns} +$$
$$\sum (\text{sizes of } VOBIs)$$

The reason why the sum of the VOBI sizes is obtained using Σ is that each VOB has a different time map size. After calculating the size of the M_AVFIT, steps S12 through S14 are performed for the M_AVFIT. In step S12, it is judged whether it is true that the M_AVFIT_EA in the M_AVFIT is not equal to "SIZE". The M_AVFIT_EA is an offset from the start of the M_AVFIT to the end of it, where the start is "0". That is to say, the M_AVFIT_EA is the size of the M_AVFIT. Accordingly, the M_AVFIT_EA should be equal to "SIZE".

In step S13, it is checked whether the M_AVFIT overlaps with the next table. The checking is made by judging whether the sum of "SIZE" obtained in step S11 and the M_AVFIT_SA in the RTR_VMGI is larger than the ORG_PGCI_SA in the RTR_VMGI.

In step S14, it is checked whether the number of VOBIs (M_AVFIT.VOBIs) managed by the M_AVFIT exceeds the highest value within specifications. When it is judged as "YES" in step S12, S13, or S14 (i.e., the condition is not satisfied), the control goes to step S19 or S20, where the volume state flag is set to "ReadOnly". Also, in step S20, the M_AVFIT.VOBIs is set to the highest value within the DVD-VIDEO RECORDING standard, and the management file with the M_AVFIT.VOBIs is read onto the semiconductor memory 9.

In the present example, it is supposed that no still picture is recorded. As a result, the flowchart shown in FIG. 28 shows a procedure in the case where the table next to the M_AVFIT is the ORG_PGCI. If a still picture was recorde, the address used in the comparison in step S13 would be the S_AVFIT_SA in the RTR_VMGI instead of the ORG_PGCI in the RTR_VMGI.

When the above three conditions are satisfied, the control moves to a loop process composed of steps S15 through S18. The number of loop executions is indicated by a variable "VobNo". In step S15, "VobNo" is cleared to zero. In step S16, "VobNo" is incremented by "1" indicating that the loop is executed once. The loop terminates when it is judged in step S17 that "VobNo" exceeds the M_AVFI.VOBIs. When the loop terminates, the third check process is performed. The validity check for the VOB [VobNo] is detailed in the flowchart shown in FIG. 29.

Figure 29:
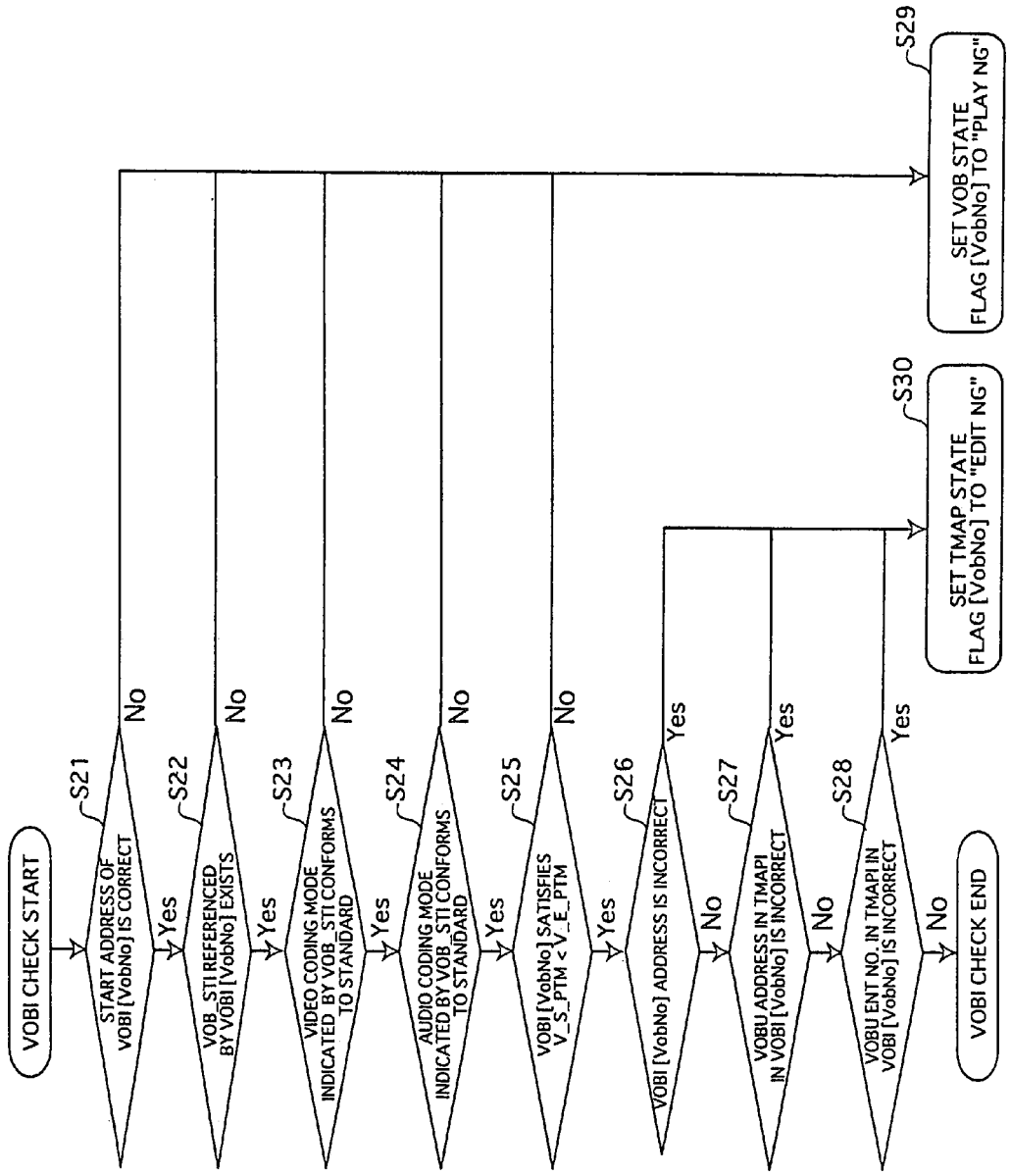
FIG. 29 is a flowchart showing the procedure of the validity check for the VOB, VOBI, and TMAPI.

The flowchart of FIG. 29 includes a plurality of judgment steps S21 through S28. The VOB, VOBI, and TMAPI specified by VobNo are judged as valid only after all the judgment steps are cleared. The steps S21 through S25 are performed to judge whether the VOB failure (7) exists. The steps S26 through S28 are performed to judge whether the TMAP failure (6) exists.

In step S21, it is judged whether the start address of the VOBI [VobNo] is correct. In step S22, it is judged whether a VOB_STI referred to by the VOBI [VobNo] exists. In step S23, it is judged whether a video coding mode specified by the VOB_STI conforms to the standard. In step S24, it is judged whether an audio coding mode specified by the VOB_STI conforms to the standard. In step S25, it is judged whether the VOB_Start_PTM and the VOB_End_PTM specified by the VOB_STI satisfy the condition "VOB_Start_PTM<VOB_End_PTM". When any of the above conditions is not satisfied, the control moves to step S29, where the VOB state flag [VobNo] is set to "Play NG".

In step S26, it is judged whether the address of the VOB [VobNo] is incorrect. In step S27, it is judged whether the VOBU address in the TMAPI contained in the VOBI [VobNo] is incorrect. In step S28, it is judged whether the VOBU_ENT number in the TMAPI contained in the VOBI [VobNo] is incorrect. When any of the above conditions is not satisfied, the control moves to step S30, where the TMAP state flag [VobNo] is set to "Edit NG".

Figure 30:
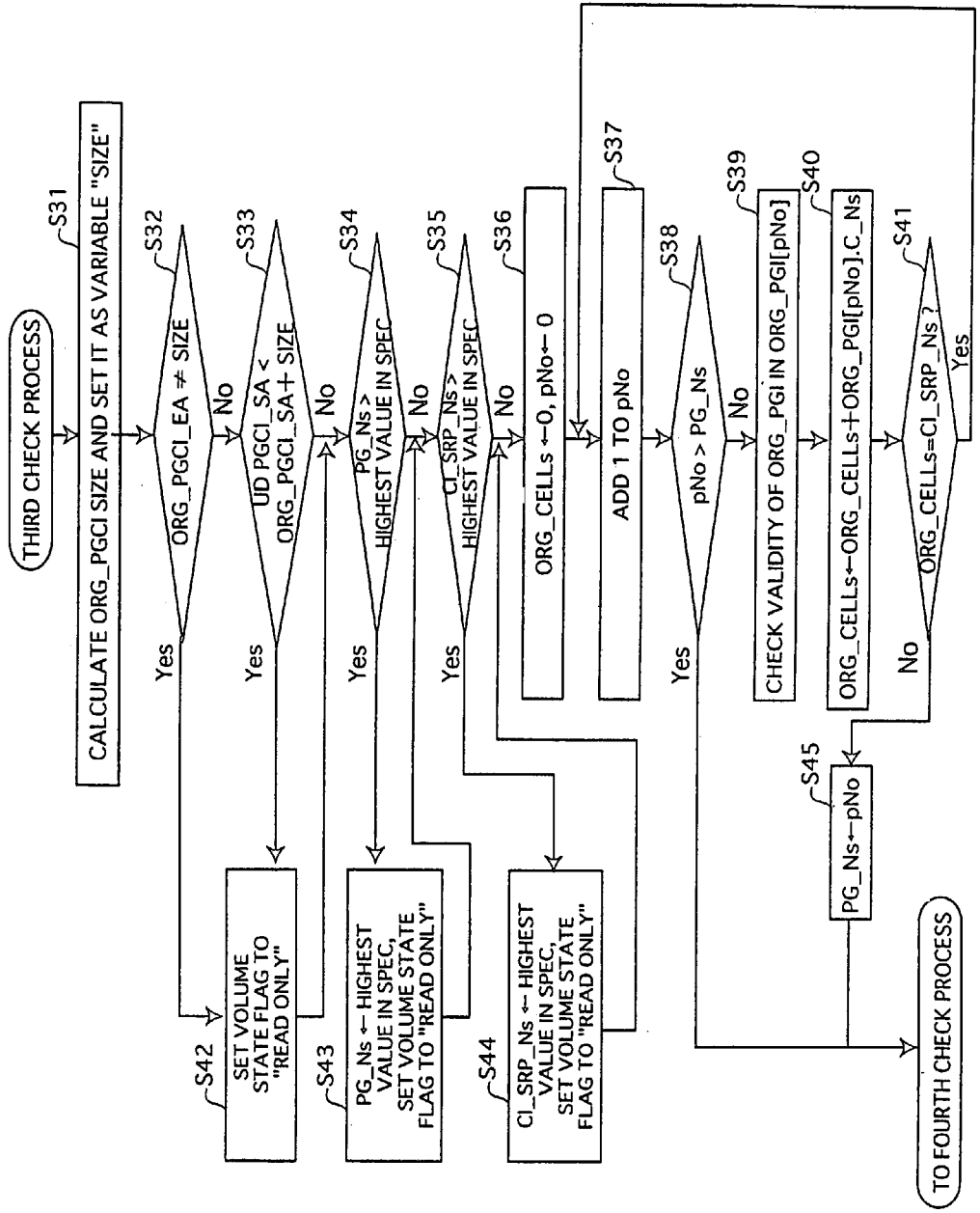
FIG. 30 is a flowchart showing the procedure of the third check process for judging the validity of the ORG_PGCI.

After the processes shown in FIGS. 28 and 29 are complete, the third check process whose flowchart is shown in FIG. 30 is performed. The third check is performed to judge whether the ORG_PGCI is valid. In step S31, the size of the ORG_PGCI is calculated and the obtained size is set as a variable "SIZE". The control then moves to the steps S32 through S35 for a plurality of judgments. These judgments are aimed to check whether the management file failure (2) exists. In step S32, it is judged whether it is true that the ORG_PGCI_EA in the ORG_PGCI is not equal to the variable "SIZE". Instep S33, it is judged whether the ORG_PGCIT overlaps with the UD_PGCIT. In step S34, it is judged whether the PG_Ns exceeds the highest value within specifications. In step S35, it is judged whether the CI_SRP_Ns exceeds the highest value within specifications. When any of the conditions is not satisfied, the control goes to steps S42 through S44, where the volume state flag is set to "ReadOnly", and in steps S44 and S45, the PG_Ns and the CI_SRP_Ns are set to the highest value within specifications, and the management file with the PG_Ns and the CI_SRP_Ns is read onto the semiconductor memory 9.

Steps S36 through S45 constitute a loop, where the number of loop executions is indicated by a variable "pNo". The variable pNo is initialized in step S36. In step S37, "pNo" is incremented by "1" indicating that the loop is executed once. The loop terminates when it is judged that "pNo" exceeds the PG_Ns. In step S40, the number of CELLs indicated by "pNo" is added to the ORG_CELLs that is initialized in step S36 together with "pNo", and the ORG_CELLs is set to the sum of these values. In step S41, the ORG_CELLs is compared with the CI_SRP_Ns. This is the first object of this loop process. When it is not judged in step S41 that the ORG_CELLs is equal to the CI_SRP_Ns, the control goes to step S45, where "pNo" is substituted for the PG_Ns, then the control goes to the fourth check process.

The second object of the loop process is to check whether the ORG_PGI indicated by "pNo" is valid, which is achieved in step S39.

Figure 31:
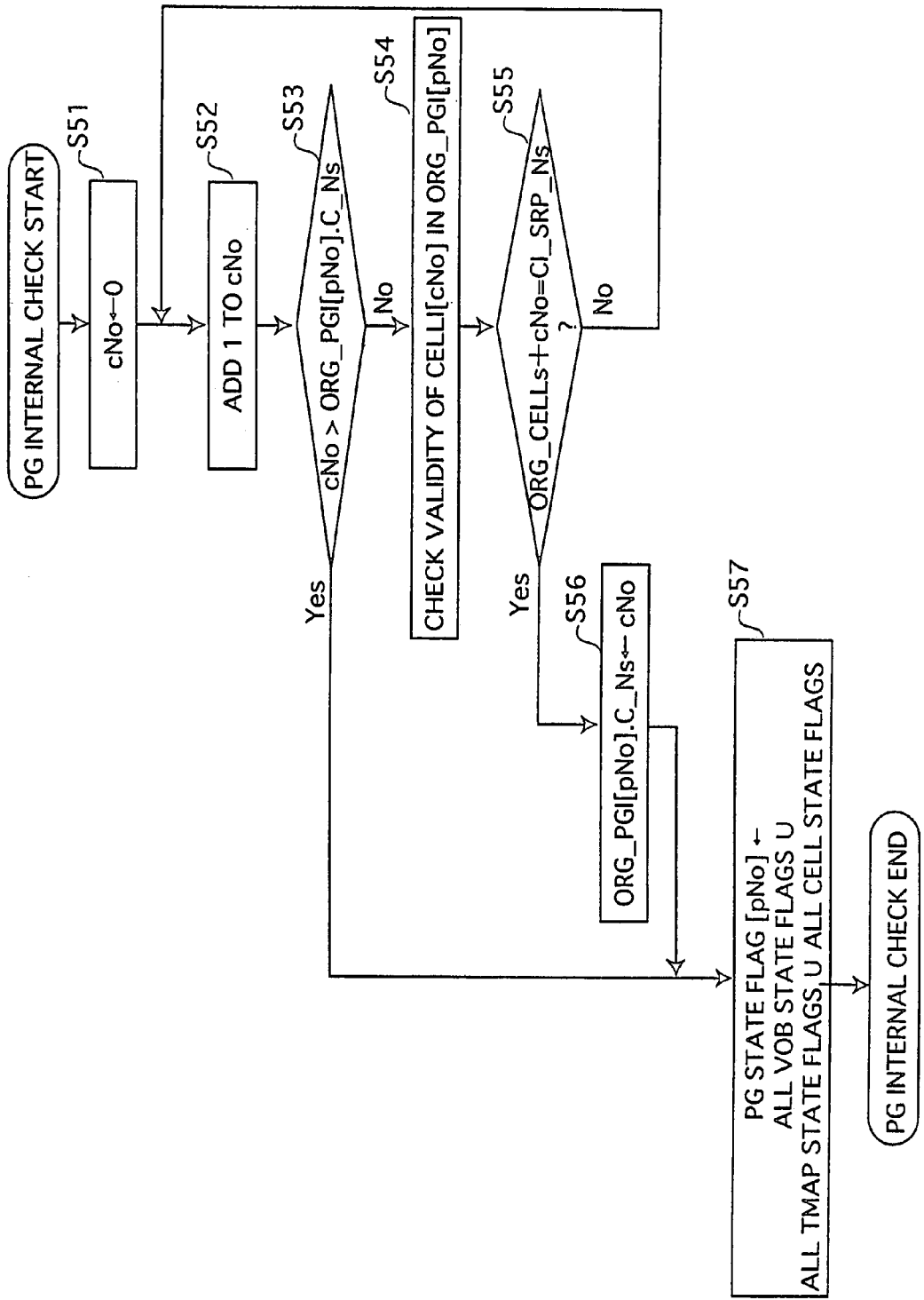
FIG. 31 is a flowchart showing the procedure of judging the validity of the ORG_PGI.

This validity check for the ORG_PGI is detailed in the flowchart shown in FIG. 31.

In the flowchart shown in FIG. 31, steps S51 through S56 constitute a loop, where the number of loop executions is indicated by a variable "cNo". The variable cNo is initialized in step S51. Instep S52, "cNo" is incremented by "1" indicating that the loop is executed once. The loop terminates when it is judged in step S53 that "cNo" exceeds the ORG_PGI [pNo]. C_Ns. The control also exits from the loop when it is judged in step S55 that the sum of the ORG-_CELLs and "cNo" is equal to the CI_SRP_Ns. It should be noted here that in this case, "cNo" is set to the ORG_PGI [pNo].C_Ns. Each time it is judged negatively in step S55, the control returns and it is judged whether the CELLI in the ORG_PGI [pNo] indicated by "cNo" is valid, until a positive judgment is made in step S53. After the PG check is over in this loop, the control goes to step S57, where the flag setting unit 4 sets the PG state flag [cNo] based on the VOB state flags, the TMAP state flags, and the CELL state flags.

Figure 32:
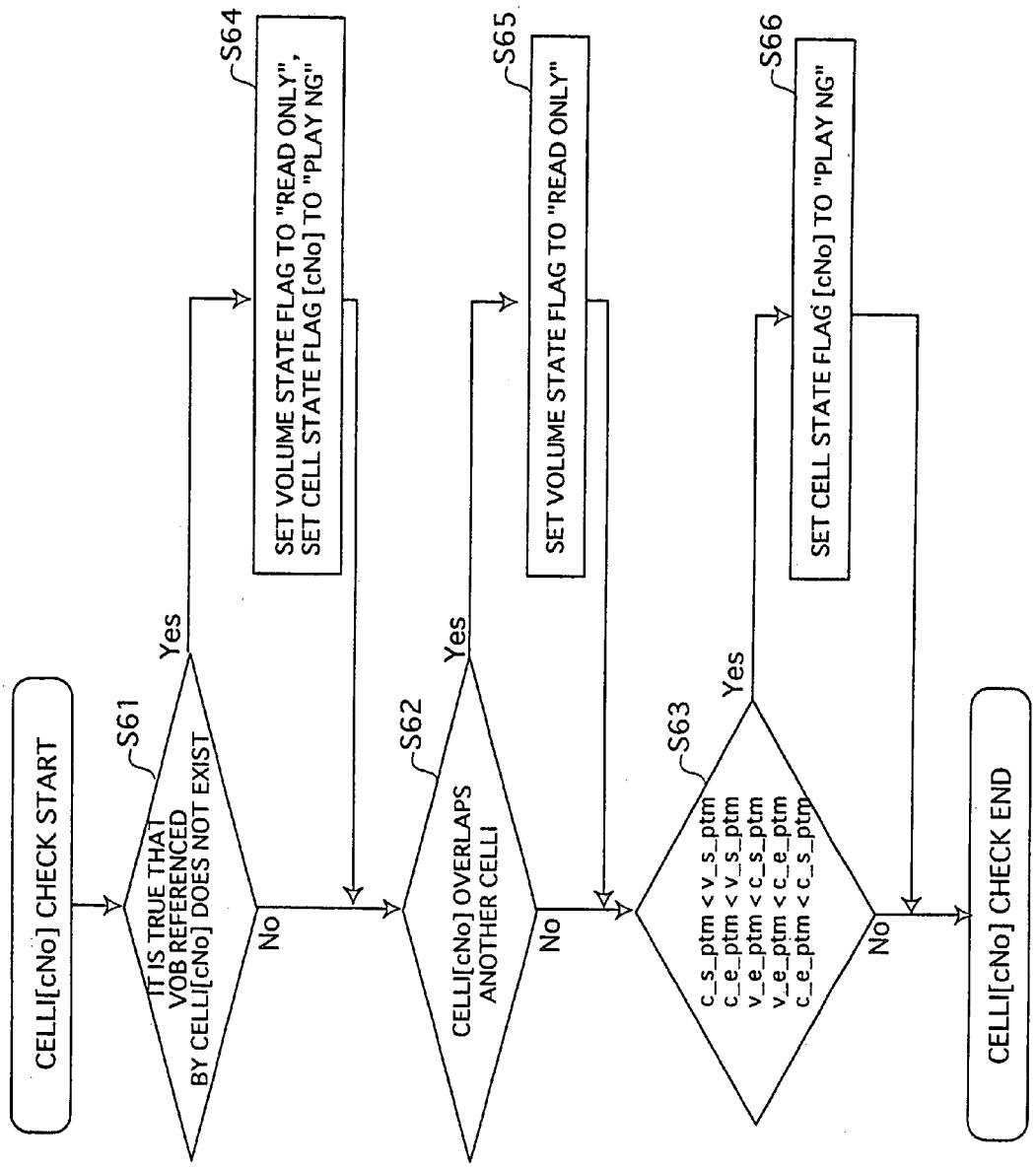
FIG. 32 is a flowchart showing the procedure of judging the validity of the CELLI in a PG.
Figure 33:
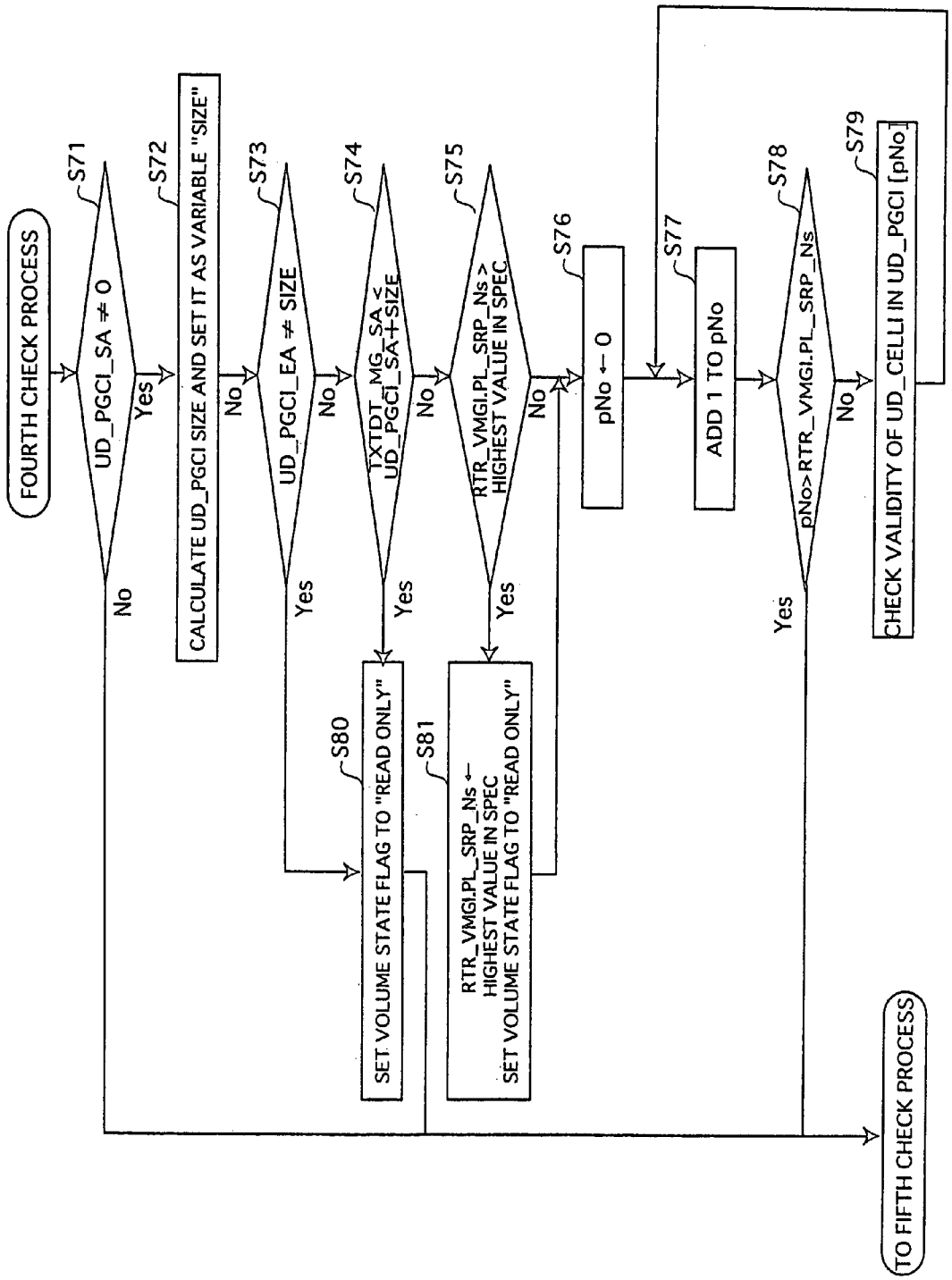
FIG. 33 is a flowchart showing the procedure of judging the validity of the UD_PGCI.

The validity check of the CELLI is detailed in the flowchart shown in FIG. 32. The flowchart contains judgment steps S61, S62, and S63 to check whether respective conditions are satisfied. In step S61, it is judged whether the CELL failure (4) exists. In step S62, it is judged whether the CELL failure (3) exists. In step S63, it is judged whether the CELL failure (5) exists. When it is judged in step S61 that no VOB referred to by the CELL [cNo] exists, the control goes to step S64, where the volume state flag is set to "ReadOnly", and the CELL state flag [cNo] is set to "Play NG". When it is judged in step S62 that the CELL [cNo] overlaps another CELL, the control goes to step S65, where the volume state flag is set to "ReadOnly". When it is judged in step S63 that any of the conditions CELL_Start_PTM<VOB_Start_PTM, CELL_End_PTM<VOB_Start_PTM, VOB_End_PTM<CELL_Start_PTM, VOB_End_PTM<CELL_End_PTM, CELL_End_PTM<CELL_Start_PTM is satisfied, the control goes to step S66, where the CELL state flag [cNo] is set to "Play NG".

Now, the fourth check process will be described. This check process is executed to check whether the UD_PGCI is valid in accordance with the flowchart shown in FIG. 33. In step S71, it is judged whether it is true that the UD_PG-CI_SA is not "0". In step S72, the size of the UD_PGCI is calculated and the variable "SIZE" is set to the calculated size. Judgments are then made in steps S73 through S75. Through these steps, it is judged whether the management file failure (2) exists. In step S73, it is judged whether it is true that the UD_PGCI_EA is not "SIZE". The step S74 is performed to check whether the TXTDT_MG overlaps the UD_PGCIT. In step S75, it is judged whether the PL_SRP_Ns indicating the PL_Ns exceeds the highest value within specifications.

When any of the above conditions is not satisfied, the control goes to step S80 or S81, where the volume state flag is set to "ReadOnly", and in step S81, the RTR_VMGI.PL_SRP_Ns is set to the highest value within specifications, and the management file with the RTR_VMGI.PL_SRP_Ns is read onto the semiconductor memory 9.

Steps S76 through S79 constitute a loop, where the number of loop executions is indicated by a variable "pNo". The variable pNo is initialized in step S76. In step S77, "pNo" is incremented by "1" indicating that the loop is executed once. The loop terminates when it is judged in step S78 that "pNo" exceeds the RTR_VMGI.PL_SRP_Ns. The object of this loop is achieved in step S78, where it is checked whether the UD_CELLI indicated by "pNo" is valid.

Figure 34:
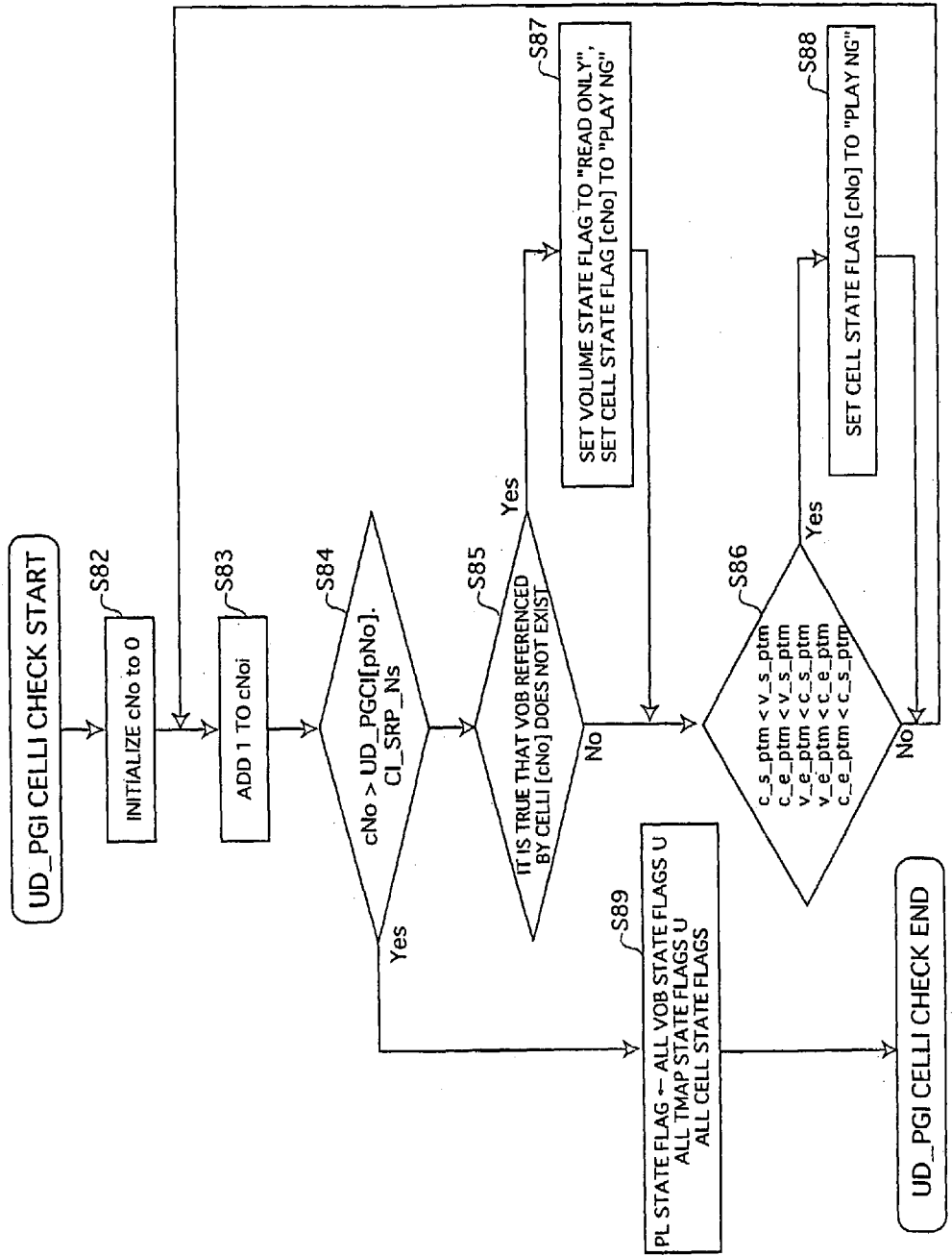
FIG. 34 is a flowchart showing the procedure of judging the validity of the UD_CELLI.

The validity check for the UD_CELLI is executed in accordance with the flowchart shown in FIG. 34. Steps S82 through S88 constitute a loop, where the number of loop executions is indicated by a variable "cNo". The variable cNo is initialized in step S82. Instep S83, "cNo" is incremented by "1" indicating that the loop is executed once. The loop terminates when it is judged in step S83 that "cNo" exceeds the CI_SRP_Ns of the UD_PGCI. The object of this loop is achieved in steps S85 and 86, where it is checked whether the CELL [cNo] satisfies certain conditions.

In step S85, it is judged whether it is true that the CELLI [cNo] does not refer to any VOB. When it is judged positively in step S85, the control goes to step S87, where the volume state flag is set to "ReadOnly", and the CELL state flag [cNo] is set to "Play NG". When it is judged in step S86 that any of the conditions CELL_Start_PTM<VOB_Start_PTM, CELL_End_PTM<VOB_Start_PTM, VOB_End_PTM<CELL_Start_PTM, VOB_End_PTM<CELL_End_PTM, CELL_End_PTM<CELL_Start_PTM is satisfied, the control goes to step S88, where the CELL state flag [cNo] is set to "Play NG". After the loop is repeated for checking as many times as there are CELLs that constitute the PL, the control goes to step S89, where the flag setting unit 4 sets the PL state flag based on the VOB state flags, the TMAP state flags, and the CELL state flags.

Figure 35:
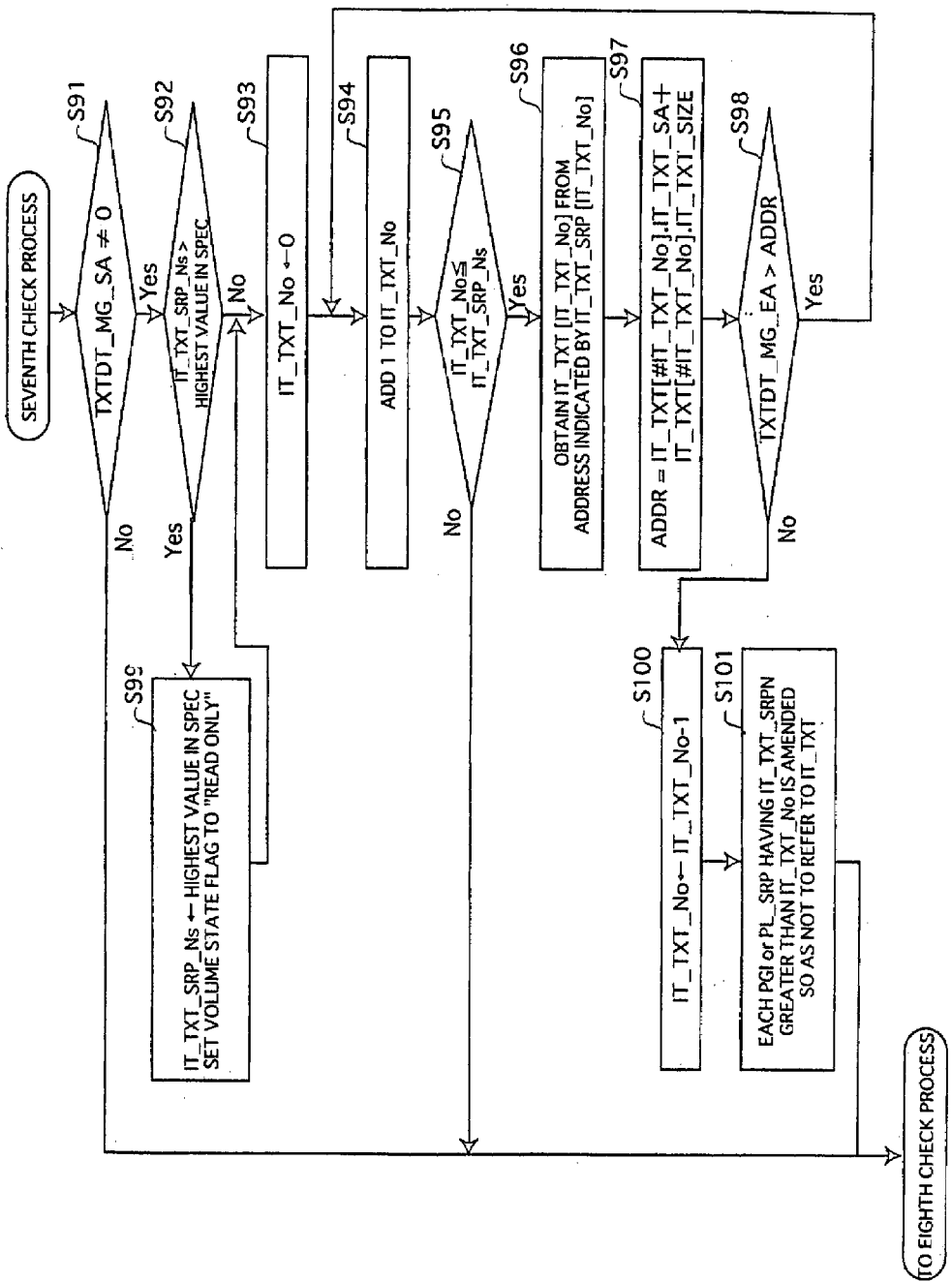
FIG. 35 is a flowchart showing the procedure of judging the validity of the TXTDT_MG.

From now on, the seventh check process will be described with reference to FIG. 35. FIG. 35 is a flowchart showing the procedure of checking the TXTDT_MG, which is an ITEM_TXT table. In step S91, it is judged whether the TXTDT_MG_SA, which is the start address of the TXTDT, is "0". In step S92, it is judged whether the IT_TXT_SRPs exceeds the highest value within specifications. When it is judged positively in step S92, the control goes to step S99, where the volume state flag is set to "ReadOnly", the IT_TXT_SRP_Ns is set to the highest value within specifications, and the management file with the IT_TXT_SR-P_Ns is read onto the semiconductor memory 9. Steps S93 through S98 constitute a loop, where the number of loop executions is indicated by the IT_TXT_No. The IT_TXT_No is initialized in step S93. In step S94, the IT_TXT_No is incremented by "1" indicating that the loop is executed once. The loop terminates when it is judged in step S95 that the IT_TXT_No exceeds the IT_TXT_SRP_Ns.

In step S96, the IT_TXT [IT_TXT_No] is obtained using an address indicated by the IT_TXT_SRP [IT_TXT_No]. In step S97, the end address "ADDR" of the IT_TXT [IT_TXT_No] is obtained by adding up the IT_TXT_SIZE and the IT_TXT_SA managed by the IT_TXT [IT_TXT_No]. In step S98, it is judged whether the TXTDT_MG_EA managed in the TXTDT_MG exceeds "ADDR". The above sequence of steps is executed each time the IT_TXT_No is incremented.

When it is judged negatively in step S98, the control goes to step S100, where the IT_TXT_No is decremented by "1". In step S101, each PGI or PL_SRP that has the IT_TXT_SRPN greater than the IT_TXT_No is amended so as not to refer to the IT_TXT, and the management file with the the IT_TXT_No is read onto the semiconductor memory 9.

Figure 36:
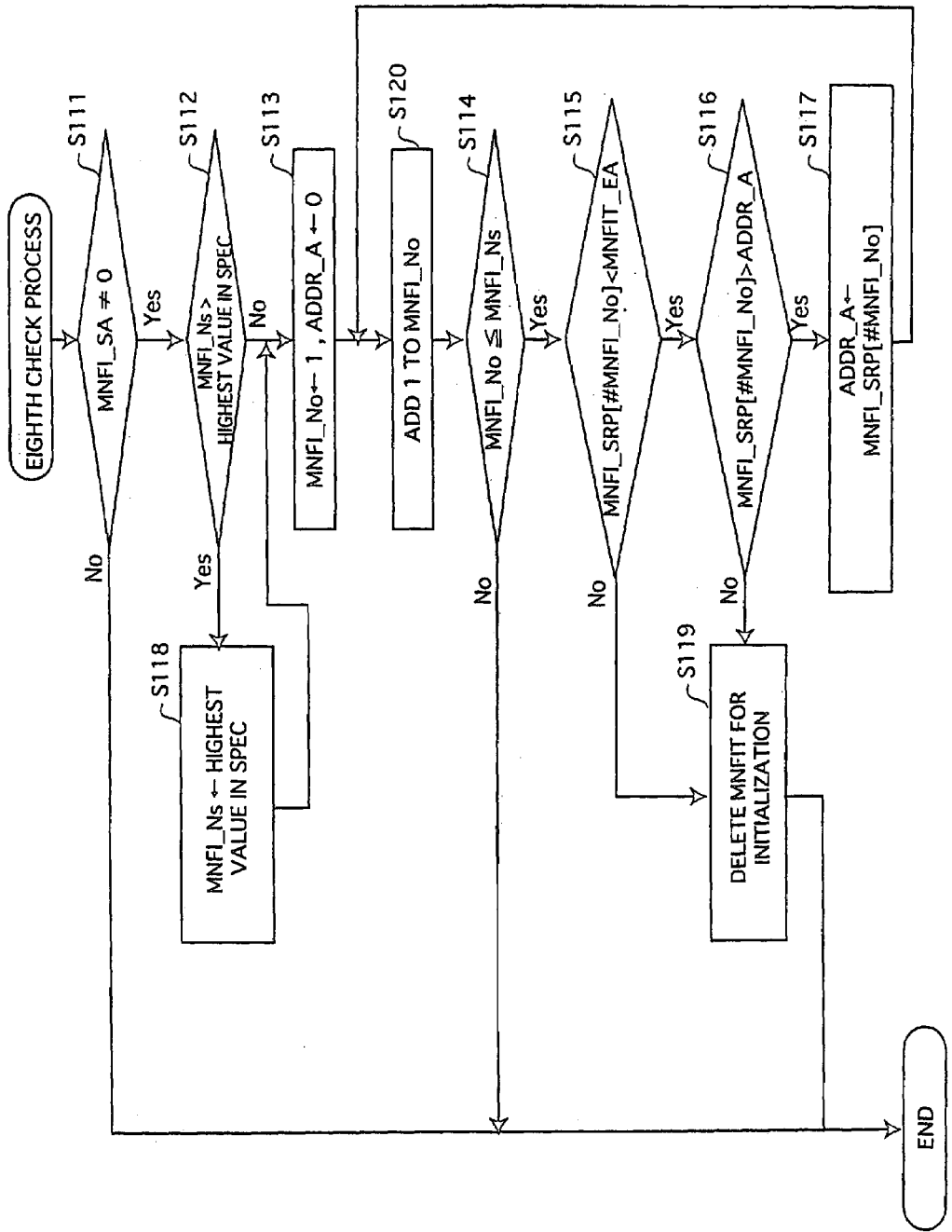
FIG. 36 is a flowchart showing the procedure of judging the validity of the MNFI.

Lastly, the eighth check process will be described with reference to FIG. 36. FIG. 36 is a flowchart showing the procedure of checking the MNFI. In step S111, it is judged whether it is true that the MNFI_SA is not "0". In step S112, it is judged whether the MNFI_Ns exceeds the highest value within specifications. When it is judged negatively in step S111, the whole process represented by the flowcharts is completed. When it is judged positively in step S112, the control goes to step S118, where the volume state flag is set to "Readonly", the MNFI_Fs is set to the highest value within specifications, and the management file with the MNFI_Fs is read onto the semiconductor memory 9. Steps S113 through S120 constitute a loop, where the number of loop executions is indicated by the MNFI_No. The MNFI_No is initialized in step S113. In step S120, the MNFI_No is incremented by "1" indicating that the loop is executed once. The loop terminates when it is judged in step S114 that the MNFI_No exceeds the MNFI_Ns. The object of the loop is achieved by judgment steps S115 and S116.

In step S115, it is judged whether the MNFI_SRP [MNFI_No] indicating the start address of the MNFI [MNFI_No] is smaller than the MNFIT_EA managed in the MNFIT. In step S116, it is judged whether the MNFI_SRP [MNFI_No] is greater than the ADDR_A. When it is judged negatively in step S115 or step S116, the control exits the loop and goes to step S119, where all MNFITs are deleted, and the management file after this amendment is read onto the semiconductor memory 9.

It should be noted here that the address "ADDR_A" is obtained by substituting the address MNFI_No for the MNFI_SRP before the MNFI_No is incremented in step S120. The substitution is performed in step S117. The address MNFI_No to be substituted is specified by the MNFI_No before the increment. As a result, in step S116, the address MNFI_SRP is compared with the previous address MNFI_SRP ("ADDR_A"). When the MNFI_SRP [MNFI_No] is no smaller than the ADDR_A, the control goes to step S119, where all MNFITs are deleted. This completes the check process.

Up to now, an embodiment of the present invention has been described. However, this embodiment is described only as a system example that is expected to provide the best effect at present. The present invention can have many variations as well without deviating from the essence of the present invention. The following are the representatives of such variations.

(A) In the above embodiment, the recording/playback apparatus may be used as a VCR for home use. Also, the recording/playback apparatus may be used as a peripheral apparatus of a computer. In the latter case, the recording/playback apparatus is connected with the computer via an interface conforming to the SCSI, IDE, or IEEE1394 standard.

(B) In the above embodiment, video streams and audio streams are multiplexed into VOBs. However, sub-picture data that is generated by compressing subtitles may also be multiplexed.

(C) The procedures described in the above embodiments with reference to flowcharts (FIGS. 27–36) may be achieved as a machine-language program. The program may be recorded onto a recording medium such as an IC card, an optical disc, or a floppy disk to be distributed or sold. The machine-language program may be installed for use onto a general-purpose computer. The computer can achieve the functions of the recording/playback apparatus described in the above embodiment, by executing the installed machine-language program.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording/playback apparatus for an optical disc on which a video object and management information of the video object are recorded, the recording/playback apparatus comprising:
    a detecting unit operable to detect a failure in the management information recorded on the optical disc inserted in the recording/playback apparatus;
    a state transition control unit operable to change a state of the inserted optical disc to (a) a first state in which reading/writing of the inserted optical disc is not available if the detected failure is a serious failure and (b) a second state in which reading/writing of the inserted optical disc is available but playback of the video object is not available if the detected failure is a light failure; and
    a writing unit operable to write data onto the optical disc if the state of the inserted optical disc is changed to the second state.

2. The recording/playback apparatus of claim 1, wherein the serious failure is that the management information has been destroyed by other data overwritten thereon, and the light failure is that the management information contains an invalid parameter.

3. The recording/playback apparatus of claim 2, wherein the invalid parameter is (a) a parameter indicating that the video object has been encoded for compression by an out-of-spec encoding method, (b) a parameter representing a playback end time of the video object that is earlier than a playback start time of the video object, or (c) a parameter representing a playback start time of the video object that is later than a playback end time of the video object.

4. The recording/playback apparatus of claim 1, wherein the management information specifies the whole or part of the video object as a playback section, and
    the serious failure is that the management information has been destroyed by other data overwritten thereon, and the light failure is that at least a start point or an end point of the specified playback section is incorrect.

5. The recording/playback apparatus of claim 4, wherein the start point or the end point of the specified playback section is incorrect if (a) the start or end point is earlier than a start point of the video object, (b) the start or end point is later than an end point of the video object, (c) the end point is earlier than the start point of the specified playback section, and (d) the start point is later than the end point of the specified playback section.

6. The recording/playback apparatus of claim 1, wherein the video object includes a plurality of blocks compressed by a plurality of variable-length encoding methods,
    the management information indicates correspondence between entry numbers, sizes, and playback times of the plurality of blocks, and
    the serious failure is that the management information has been destroyed by other data overwritten thereon.

7. The recording/playback apparatus of claim 6, wherein the state transition control unit changes the state of the inserted optical disc to a third state in which reading/writing of the inserted optical disc is available but editing of the video object is not available, if the detected failure is that size or entry number of a block in the management information is incorrect.

8. A recording/playback apparatus for an optical disc on which a video object and management information of the video object are recorded, the recording/playback apparatus comprising:
    a detecting unit operable to detect a failure in the management information recorded on the optical disc inserted in the recording/playback apparatus;
    a state transition control unit operable to change a state of the inserted optical disc to (a) a first state in which reading/writing of the inserted optical disc is not available if the detected failure is a serious failure, (b) a second state in which reading/writing of the inserted optical disc is available but playback of the video object is not available if the detected failure is a first light failure, and (c) a read only state if the detected failure is a second light failure;
    a writing unit operable to write data onto the optical disc if the state of the inserted optical disc is changed to the second state; and
    a playback unit operable to play back the video object recorded on the inserted optical disc if the state of the inserted optical disc is changed to the read only state.

9. The recording/playback apparatus of claim 8, wherein the serious failure is that the management information has been destroyed by other data overwritten thereon, (b) the first light failure is that the management information contains an invalid parameter, and (c) the second light failure is that the total number of pieces of management information exceeds a predetermined number.

10. The recording/playback apparatus of claim 9, wherein the invalid parameter is (a) a parameter indicating that the video object has been encoded for compression by an out-of-spec encoding method, (b) a parameter representing a playback end time of the video object that is earlier than a playback start time of the video object, or (c) a parameter representing a playback start time of the video object that is later than a playback end time of the video object.

11. The recording/playback apparatus of claim 1, wherein
the management information specifies the whole or part of the video object as a playback section,
the serious failure is that the management information has been destroyed by other data overwritten thereon, the first light failure is that at least a start point or an end point of the specified playback section is incorrect, and the second light failure is (i) that the total number of pieces of management information exceeds a predetermined number or (ii) that a playback section specified by a piece of management information overlaps another playback section specified by another piece of management information.

12. The recording/playback apparatus of claim 11, wherein
the start point or the end point of the specified playback section is judged to be incorrect if (a) the start point or the end point of the specified playback section is earlier than a start point of the video object, (b) the start point or the end point of the specified playback section is later than an end point of the video object, (c) the end point of the specified playback section is earlier than the start point of the specified playback section, and (d) the start point of the specified playback section is later than the end point of the specified playback section.

13. The recording/playback apparatus of claim 8, wherein
the video object includes a plurality of blocks compressed by a plurality of variable-length encoding methods,
the management information indicates correspondence between entry numbers, sizes, and playback times of the plurality of blocks, and
the serious failure is that the management information has been destroyed by other data overwritten thereon, and
the second light failure is that the total number of pieces of management information exceeds a predetermined number.

14. The recording/playback apparatus of claim 13, wherein
the state transition control unit changes the state of the inserted optical disc to a third state in which reading/writing of the inserted optical disc is available but editing of the video object is not available, if the detected failure is that size or entry number of a block in the management information is incorrect.

15. A playback apparatus for an optical disc on which a plurality of video objects and management information of the plurality of video objects are recorded,
each video object is a sequence of picture data,
the management information contains a plurality of pieces of route information,
each piece of route information contains at least one piece of section information that defines playback routes, each of which is composed of at least one playback section,
each piece of section information specifies a playback section that spans from a piece of picture data to another piece of picture data in a video object,
the playback apparatus comprising:
a detecting unit operable to detect a failure in the management information;
a first setting unit operable to, if the detected failure relates to a video object, set every piece of route information that contains section information specifying a playback section constituting the video object, to "playback not available"; and
a second setting unit operable to, if the detected failure relates to a piece of section information, set only a piece of route information that contains the piece of section information.

16. The playback apparatus of claim 15, wherein
the failure relating to a video object is (a) a failure that the video object has been encoded for compression by an out-of-spec encoding method, (b) a failure that a playback end time of the video object is earlier than a playback start time of the video object, or (c) a failure that the playback start time of the video object is later than the playback end time of the video object.

17. The playback apparatus of claim 15, wherein
the failure relating to a piece of section information is (a) a failure that a piece of picture data specified in the piece of section information as an end point of a playback section is earlier than a piece of picture data specified in the piece of section information as a start point of the playback section, or (b) a failure that a piece of picture data specified in the piece of section information as a start point of a playback section is later than a piece of picture data specified in the piece of section information as an end point of the playback section.

18. The playback apparatus of claim 15, wherein
each piece of section information contains (a) a time code specifying a piece of picture data as a start point of a playback section and (b) a time code specifying a piece of picture data as an end point of the playback section, and
the failure relating to a piece of section information is (i) a failure that a time code specifying a piece of picture data as a start point of a playback section is earlier than a playback start time of the video object, or (ii) a failure that a time code specifying a piece of picture data as an end point of a playback section is later than a playback end time of the video object.

19. The playback apparatus of claim 15, wherein
each video object is divided into groups, each of which is composed of pieces of picture data having correspondence with each other,
the management information contains a plurality of pieces of time map information that correspond to the plurality of video objects on a one-to-one basis,
each piece of time map information indicates, for each group belonging to a video object, correspondence between entry numbers, sizes of a plurality of pieces of picture data contained in the group, and playback times of the plurality of pieces of picture data, and
the recording/playback apparatus further comprising
a third setting unit operable to, if the detected failure relates to a piece of time map information, set every piece of route information that contains section information specifying a playback section of a video object corresponding to the piece of time map information, to "editing not available".

20. The playback apparatus of claim 19, wherein
the failure relating to a piece of time map information is a failure that any of an entry number, a data size, and a playback time indicated by the piece of time map information is incorrect.

21. A recording medium on which a computer-readable program is recorded, the program causing a computer to operate in accordance with a recording/playback procedure for an optical disc on which a video object and management information of the video object are recorded, the program causing the computer to execute:

a detecting step for detecting a failure in the management information recorded on the optical disc inserted in the computer;

a state transition control step for changing a state of the inserted optical disc to (a) a first state in which reading/writing of the inserted optical disc is not available if the detected failure is a serious failure and (b) a second state in which reading/writing of the inserted optical disc is available but playback of the video object is not available if the detected failure is a light failure; and a writing step for writing data onto the optical disc if the state of the inserted optical disc is changed to the second state.

22. A recording/playback method for an optical disc on which a video object and management information of the video object are recorded, the recording/playback method comprising:

a detecting step for detecting a failure in the management information recorded on the optical disc inserted in the computer;

a state transition control step for changing a state of the inserted optical disc to (a) a first state in which reading/writing of the inserted optical disc is not available if the detected failure is a serious failure and (b) a second state in which reading/writing of the inserted optical disc is available but playback of the video object is not available if the detected failure is a light failure; and a writing step for writing data onto the optical disc if the state of the inserted optical disc is changed to the second state.

23. A recording medium on which a computer-readable program is recorded, the program causing a computer to operate in accordance with a recording/playback procedure for an optical disc on which a video object and management information of the video object are recorded, the program causing the computer to execute:

a detecting step for detecting a failure in the management information recorded on the optical disc inserted in the computer;

a state transition control step for changing a state of the inserted optical disc to (a) a first state in which reading/writing of the inserted optical disc is not available if the detected failure is a serious failure, (b) a second state in which reading/writing of the inserted optical disc is available but playback of the video object is not available if the detected failure is a first light failure, and (c) a read only state if the detected failure is a second light failure;

a writing step for writing data onto the optical disc if the state of the inserted optical disc is changed to the second state; and a playback step for playing back the video object recorded on the inserted optical disc if the state of the inserted optical disc is changed to the read only state.

24. A recording/playback method for an optical disc on which a video object and management information of the video object are recorded, the recording/playback method comprising:

a detecting step for detecting a failure in the management information recorded on the optical disc inserted in the computer;

a state transition control step for changing a state of the inserted optical disc to (a) a first state in which reading/writing of the inserted optical disc is not available if the detected failure is a serious failure, (b) a second state in which reading/writing of the inserted optical disc is available but playback of the video object is not available if the detected failure is a first light failure, and (c) a read only state if the detected failure is a second light failure;

a writing step for writing data onto the optical disc if the state of the inserted optical disc is changed to the second state; and a playback step for playing back the video object recorded on the inserted optical disc if the state of the inserted optical disc is changed to the read only state.

25. A recording medium on which a computer-readable program is recorded, the program causing a computer to operate in accordance with a playback procedure for an optical disc on which a plurality of video objects and management information of the plurality of video objects are recorded, each video object is a sequence of picture data, the management information contains a plurality of pieces of route information, each piece of route information contains at least one piece of section information that defines playback routes, each of which is composed of at least one playback section, each piece of section information specifies a playback section that spans from a piece of picture data to another piece of picture data in a video object, the program causing the computer to execute:

a detecting step for detecting a failure in the management information;

a first setting step for, if the detected failure relates to a video object, setting every piece of route information that contains section information specifying a playback section constituting the video object, to "playback not available"; and a second setting step for, if the detected failure relates to a piece of section information, setting only a piece of route information that contains the piece of section information.

26. A playback method for an optical disc on which a plurality of video objects and management information of the plurality of video objects are recorded, each video object is a sequence of picture data, the management information contains a plurality of pieces of route information, each piece of route information contains at least one piece of section information that defines playback routes, each of which is composed of at least one playback section, each piece of section information specifies a playback section that spans from a piece of picture data to another piece of picture data in a video object, the playback method comprising:

a detecting step for detecting a failure in the management information;

a first setting step for, if the detected failure relates to a video object, setting every piece of route information that contains section information specifying a playback section constituting the video object, to "playback not available"; and a second setting step for, if the detected failure relates to a piece of section information, setting only a piece of route information that contains the piece of section information.

* * * * *